United States Patent
Brown et al.

[11] Patent Number: 6,122,696
[45] Date of Patent: *Sep. 19, 2000

[54] CPU-PERIPHERAL BUS INTERFACE USING BYTE ENABLE SIGNALING TO CONTROL BYTE LANE STEERING

[76] Inventors: Andrew T. Brown, 208 S. Grant St., Ft. Collins, Colo. 80521; Marvin W. Martinez, Jr., 3528 Omar La., Plano, Tex. 75023

[*] Notice: This patent issued on a continued prosecution application filed under 37 CFR 1.53(d), and is subject to the twenty year patent term provisions of 35 U.S.C. 154(a)(2).

[21] Appl. No.: 08/937,821

[22] Filed: Sep. 29, 1997

Related U.S. Application Data

[63] Continuation of application No. 08/754,470, Nov. 22, 1996, abandoned, which is a continuation of application No. 08/368,074, Jan. 3, 1995, abandoned.

[51] Int. Cl.[7] .................................................. G06F 13/00
[52] U.S. Cl. ............................................. 710/127; 710/66
[58] Field of Search ........................................ 710/127, 66

[56] References Cited

U.S. PATENT DOCUMENTS

| | | |
|---|---|---|
| 4,447,878 | 5/1984 | Kinnie et al. ............................. 395/307 |
| 4,683,534 | 7/1987 | Tietjen et al. ............................. 395/307 |
| 4,716,527 | 12/1987 | Graciotti ................................. 395/307 |
| 4,761,729 | 8/1988 | Byron ...................................... 395/886 |
| 5,280,598 | 1/1994 | Osaki et al. ............................. 395/307 |
| 5,373,467 | 12/1994 | Wang ...................................... 395/307 |
| 5,388,227 | 2/1995 | McFarland ............................. 395/325 |
| 5,394,528 | 2/1995 | Kobayashi et al. ..................... 395/307 |
| 5,408,678 | 4/1995 | Kato et al. ............................. 395/800 |
| 5,416,907 | 5/1995 | Polzin et al. ........................... 395/886 |
| 5,428,763 | 6/1995 | Lawler ................................... 395/886 |

*Primary Examiner*—Ayaz R. Sheikh
*Assistant Examiner*—David A. Wiley

[57] ABSTRACT

A CPU-Peripheral bus interface for 64-bit local bus to 32-bit peripheral bus uses byte enable signaling to provide byte lane steering. Qbuffer logic provides a hardware interface that interfaces directly to the processor local-bus—a Qbuffer protocol using conventional byte enable signals provides lane steering to eliminate the need for separate multiplexing logic. The Qbuffer protocol signals include a BE control signal asserted by the system logic to cause the CPU to relinquish control of the byte enable control lines, such that the system control logic is able to drive the BE control lines with byte enable codes to implement lane steering for CPU-Peripheral transfers.

4 Claims, 14 Drawing Sheets

CPU-PERIPHERAL BUS INTERFACE USING BYTE ENABLE SIGNALING TO CONTROL BYTE LANE STEERING

CROSS REFERENCE TO RELATED APPLICATIONS

This present application is a file wrapper continuation of application Ser. No. 08/754,470, filed Nov. 22, 1996, now abandoned, which was a file wrapper continuation of Ser. No. 08/368,074, filed Jan. 3, 1995, now abandoned. This patent is related to the following copending U.S. Patent Application, all commonly assigned, and all of which are incorporated by reference: (a) Ser. No. 08/367,625, titled "CPU-Peripheral Bus Interface With Interface Buffer For Byte Lane Steering", filed Jan. 2, 1995, (b) Ser. No. 08/869,667, titled "CPU-Peripheral Bus Interface With An Interface Buffer For Caching DMA Reads", filed Jan. 2, 1995, (c) Ser. No. 08/630,313, titled "Bus Arbitration Protocol Using AHOLD", filed Jan. 2, 1995, and (d) Ser. No. 08/853,314, titled "CPU Communication Protocol Using Byte Enable Sideband Signaling", filed Jan. 2, 1995.

BACKGROUND

1. Technical Field

The invention relates generally to computer systems and more particularly relates to a CPU/Peripheral bus interface where the processor local (system) bus is wider than the peripheral bus.

In an exemplary embodiment, a CPU/peripheral bus interface and bus arbitration protocol are used in a computer system based on a 64-bit x86 class microprocessor in which the processor local bus is 64-bits, and the peripheral bus is the 32-bit BL bus.

2. Related Art

Microprocessor-based computer systems commonly include both a processor local (system) bus, and a peripheral bus. The local bus is used for data transfers between the microprocessor (CPU) and system memory (DRAM and L2 cache)—address and control buses are included in the local bus architecture. The peripheral bus is used for data transfers to/from various peripheral devices (such a video controller, disk, keyboard, etc.).

The CPU initiates data transfers with peripheral devices by running I/O Read/Write bus cycles—in addition, if the computer system supports direct memory access (DMA), a peripheral device can initiate DMA transfers with system memory. For DMA Reads/Writes, and arbitration protocol is used to arbitrate control of the local bus for DMA transfers.

Without limiting the scope of the invention, this background information is provided in the context of a specific problem to which the invention has application: in an computer system based on a 64-bit x86 microprocessor, providing an improved interface between the 64-bit processor local bus and a 32-bit VL peripheral bus, and improving DMA operations.

For x86 computer systems, a typical 64-bit system configuration includes a 64-bit microprocessor such as a Power[586] manufactured by Cyrix Corporation interfaced to a memory subsystem (DRAM and L2 cache) over a 64-bit local bus, allowing data transfers of two dwords (8 bytes). Such 64 bit systems are commonly configured with both a high performance peripheral bus, such as the 32-bit VL bus, and a 16-bit ISA bus for compatibility with existing ISA peripherals.

System (chipset) logic includes memory/bus controller for controlling CPU-Memory (DRAM and L2 cache) data transfers, and in the case of DMA transfers, arbitration of control of the local bus. This chipset logic also controls the CPU-Peripheral bus interface between the 64-bit local bus and the peripheral bus, supporting both CPU-initiated and DMA transfers.

In the x86 bus architecture, bus cycles (on the local bus) are defined by bus cycle definition and control signals. Bus cycle definition signals are driven by the CPU, and include (a) M/IO#—distinguishes memory and I/O cycles, (b) D/C#—distinguishes between data transfer cycles and control operations (such as halt, interrupt acknowledge, and code fetch), and (c) W/R#—distinguishes between write and read cycles. Bus cycle control signals include: (a) ADS#—driven by the CPU to indicate that valid address and bus cycle definition signals are available, and (b) BRDY#—driven by the system logic to indicate that the current transfer within a burst cycle or the current single-transfer bus cycle can be terminated.

In addition, for data transfer cycles, the CPU drives byte enable signals BE#<7:0> onto eight byte enable signal lines. The byte enable signals provide a byte enable code designating the valid data bytes within the 64-bit (8 byte) data transfer.

The 32-bit VL bus supports 4 byte (dword) transfers, and provides a direct connection to the processor local bus—the current principal application for this bus is to provide a local bus video interface. The 16-bit ISA bus supports byte and word (2 byte) transfer, and is the bus interface for a wide class of industry-standard peripherals (keyboard, disks, add-on cards, etc.)—a VL/ISA converter (bridge) chip interfaces VL to ISA, controlling data transfers between ISA peripherals and CPU-Memory over the VL bus.

DMA is supported for both VL masters and ISA peripherals. In ISA-only systems, an ISA DMA controller and the memory/bus controller are tightly coupled—the memory/bus controller runs the DMA bus cycles. In VL bus systems, the VL masters are granted (through arbitration) direct access to the local bus for running VL master bus cycles—if the system includes a VL/ISA converter, it typically functions as a VL master.

The x86 bus architecture currently supports two bus arbitration protocols for DMA accesses to system memory: (a) HOLD/HLDA (Hold Acknowledge), and (b) BOFF# (Back-Off). For the HOLD/HLDA protocol, HOLD is asserted by the memory/bus controller to the CPU, which completes the current bus cycle, and then returns HLDA, relinquishing control of (tristating) the local bus. The BOFF# protocol is used to obtain immediate access to the local bus—in response to BOFF# from the memory/bus controller, the CPU aborts the current bus cycle, and relinquishes local bus control (an aborted bus cycle must be restarted in its entirety when BOFF# is deasserted).

For 64-bit computer systems, implementing a CPU-Peripheral bus interface necessarily involves a hardware mechanism for interfacing the 64-bit processor local bus to the 32-bit VL peripheral bus. Specifically, the VL bus is interfaced to the local bus—byte lane steering is used to multiplex 64-bit data transfers onto the 32-bit VL bus one dword at a time. The VL/ISA converter interfaces the 16-bit ISA but to the low word of the VL bus.

Current 64-bit computer systems use a multiplexer to provide the hardware interface between the processor local and VL peripheral buses. A 64/32 CPU/VL interface multiplexer includes a 64-bit interface to the local bus and a 32 bit interface to the VL bus, together with multiplexing logic to implement lane steering. Currently available 64/32 interface multiplexers require more than 160 signal pins for the 64/32 bit data buses and associated control. In addition, the I/O drivers for the data buses require tight control and increase bus loading.

SUMMARY

An object of the invention is to provide an improved CPU-Peripheral bus interface that provides lane steering without requiring using an interface protocol implemented with existing bus control signals.

This and other objects of the invention are achieved by a CPU-Peripheral bus interface used in a computer system with a processor (CPU) coupled to system memory over a local bus at least 2N bits wide, and to peripheral devices over a peripheral bus N bits wide. The local bus has at least first and second bus lanes each N bits wide respectively for transferring first and second data blocks of N-bits each. A bus interconnect circuit interconnects the N bit peripheral bus to the first bus lane of the local bus.

In addition, the computer system includes byte enable control lines used by the CPU to signal, for each data transfer, a byte enable code uniquely identifying each byte of the first and/or second data blocks that is involved in the data transfer.

In one aspect of the invention, the CPU-Peripheral bus interface includes interface buffer logic and interface control logic.

The interface buffer logic is to the CPU and to the local bus—it includes an interface buffer for storing at least one 2N-byte data block in first and second buffer blocks corresponding to the first and second data blocks.

The interface control logic is coupled to exchange interface protocol signals with the interface buffer logic and the CPU to control the loading and unloading of the interface buffer. The interface protocol signals include a BE control signal asserted by the interface control logic to cause the CPU to relinquish control of the byte enable control lines, such that the interface control logic is able to drive the Be control lines with byte enable codes.

The interface control logic uses interface protocol signals, including the BE control signal and byte enable codes to effect the transfer of data between the CPU and a peripheral device through the bus interface circuit, including (i) for transfers from the peripheral device to the CPU, loading the interface buffer by using byte enable codes to steer selected bytes of the first and second data blocks received from the peripheral device respectively to the first and second buffer blocks of the interface buffer, and (ii) for transfers from the CPU to the peripheral device, unloading the interface buffer by using byte enable codes to steer selected bytes of the first and second data blocks respectively from the first and second buffer blocks of the interface buffer to the first bus lane of the local bus. In accordance with this protocol, such transfers of first and second data blocks between the CPU and the peripheral device occur sequentially over the N-bit first bus lane of the local bus and the N-bit peripheral bus through the bus interface circuit.

Embodiments of the invention may be implemented to realize one or more of the following technical advantages. The CPU-Peripheral bus interface is implemented using Qbuffer logic and a Qbuffer protocol. The Qbuffer logic provides a hardware interface that interfaces directly to the processor local bus, with the Qbuffer protocol providing lane steering to eliminate the need for separate multiplexing logic. The Qbuffer protocol uses the conventional byte enable signals to perform lane steering. For DMA operations, a bus arbitration protocol using AHOLD permits arbitration without waiting for a current bus cycle to complete (as in the case of HOLD/HLDA), and without requiring an aborted bus cycle to be restarted (as in the case of BOFF#). The Qbuffer logic can be located internal or external to the CPU—with the Qbuffer logic located internally, the CPU automatically generates parity for all transfers to system memory. Using separate Q and P buffers allows the Qbuffer to be used for DMA operations, providing a DMA read cache (DMA write gathering can also be used). The CPU-Peripheral bus interface can be used to design a computer system motherboard that is upgradeable from a 32 bit microprocessor to a 64 bit microprocessor—a M/B controller includes Qbuffer protocol logic that can be disabled if a 32-bit microprocessor is installed (which would interface directly to a 32 bit peripheral bus), and enabled if a 64-bit microprocessor with an internal Qbuffer is installed, thereby implementing the 64/32 bit CPU-Peripheral bus interface and Qbuffer protocol.

For a more complete understanding of the invention, and for further features and advantages, references is now made to the Detailed Description of an exemplary embodiment of the invention, together with the accompanying Drawings, it being understood that the invention encompasses any modifications or alternative embodiments that fall with the scope of the claims.

DRAWINGS

Figure 1A:
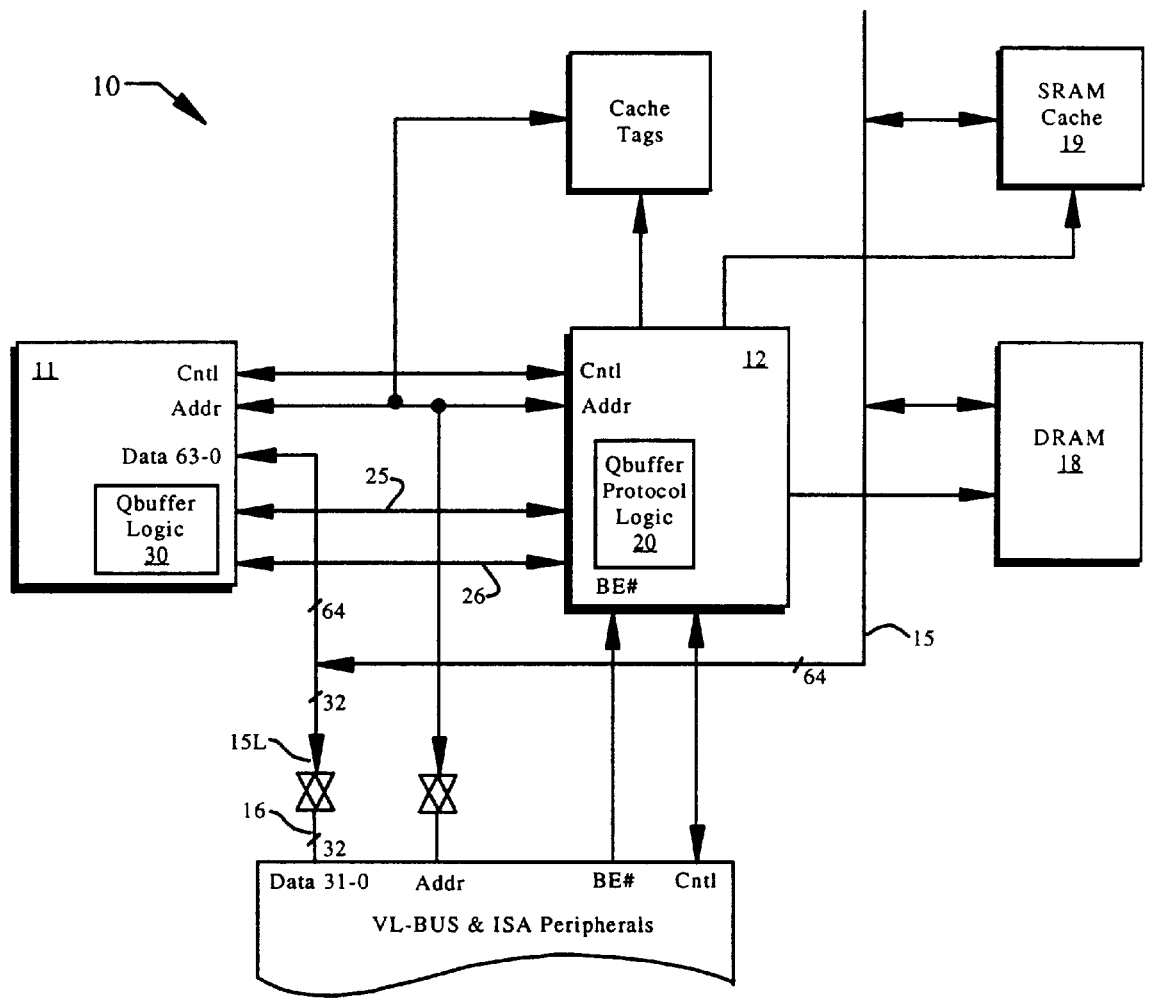
FIG. 1a illustrates an exemplary computer system including a 64-bit microprocessor interface to a 64-bit processor local bus and a 32-bit VL peripheral bus, with the microprocessor incorporating Qbuffer logic, and a M/B (memory/bus) controller including Qbuffer protocol logic for implementing a CPU-Peripheral bus interface in accordance with one aspect of the invention.
Figure 1B:
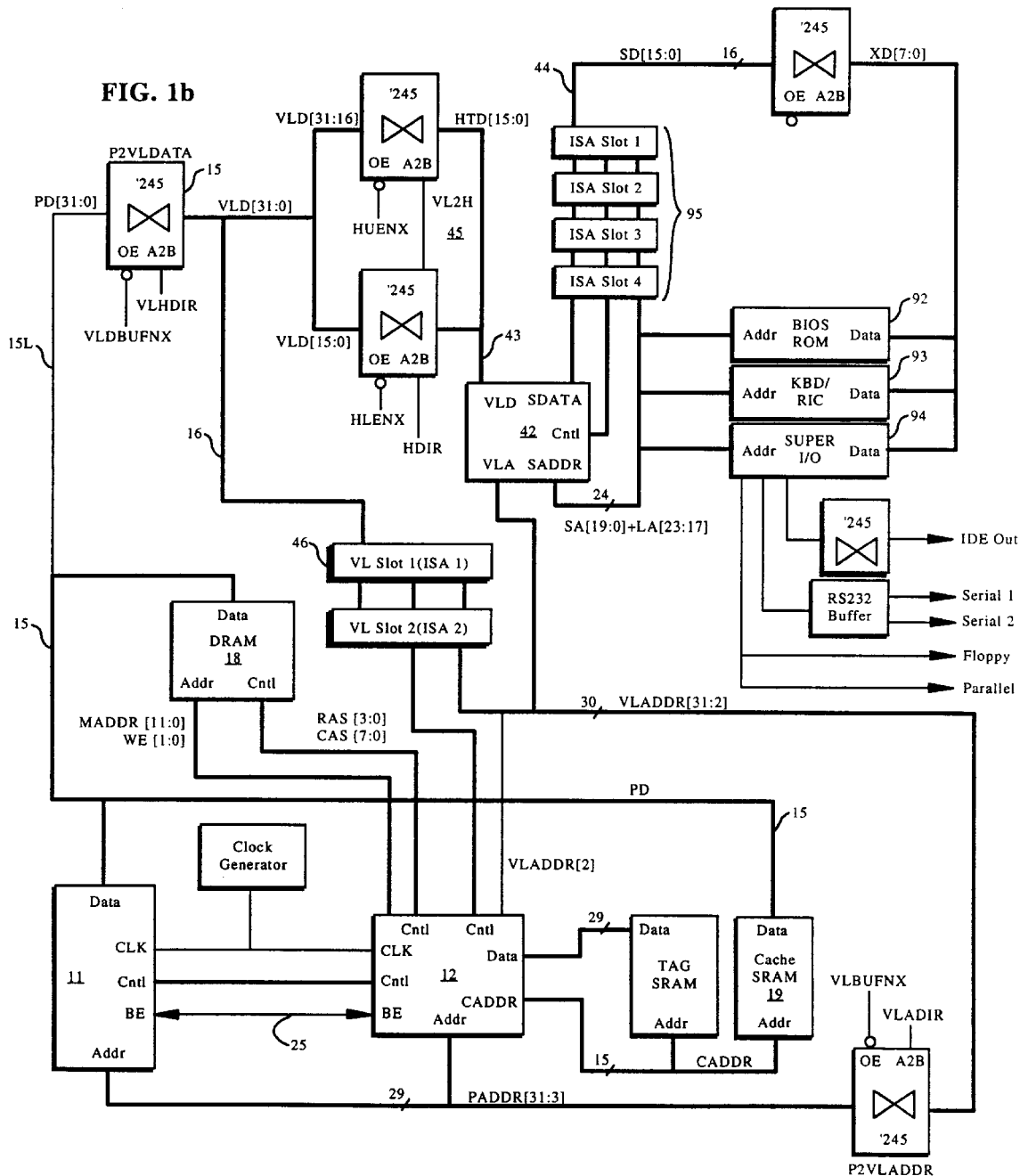
FIG. 1b illustrates in more detail the computer system, including 32-bit VL and 16-bit ISA peripheral buses, and a VL/ISA converter.
Figure 1C:
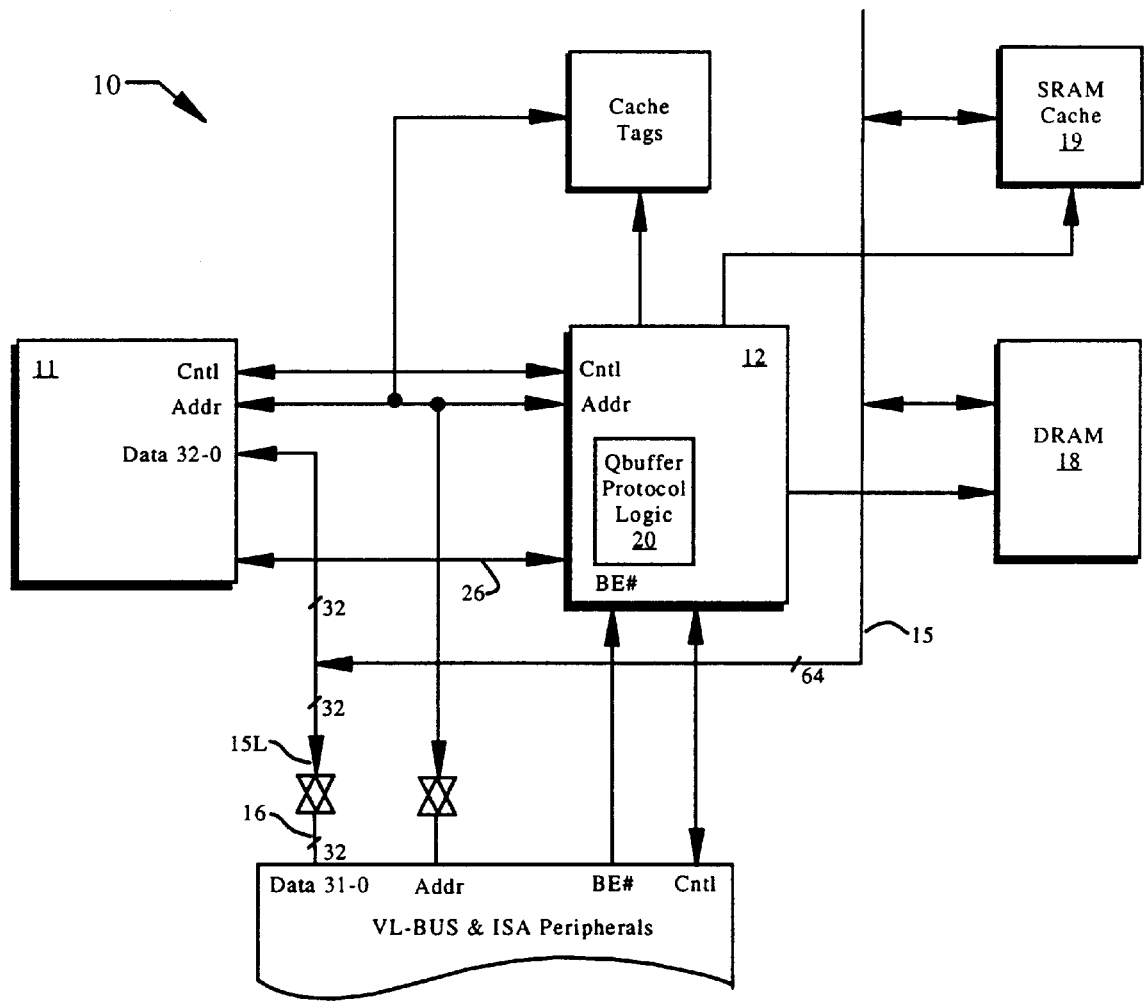

FIG. 1c illustrates an alternative embodiment of the computer system in FIG. 1a configured with a 32-bit microprocessor interfaced to the lower 32-bits of the 64-bit processor local bus (and to the 32-bit VL bus), and with the Qbuffer protocol logic in the M/B controller being disabaled—this alternate computer system is upgradeable to the computer system in FIG. 1a by installing a 64 microprocessor and enabling the Qbuffer protocol logic in the M/B controller.

Figure 2A:
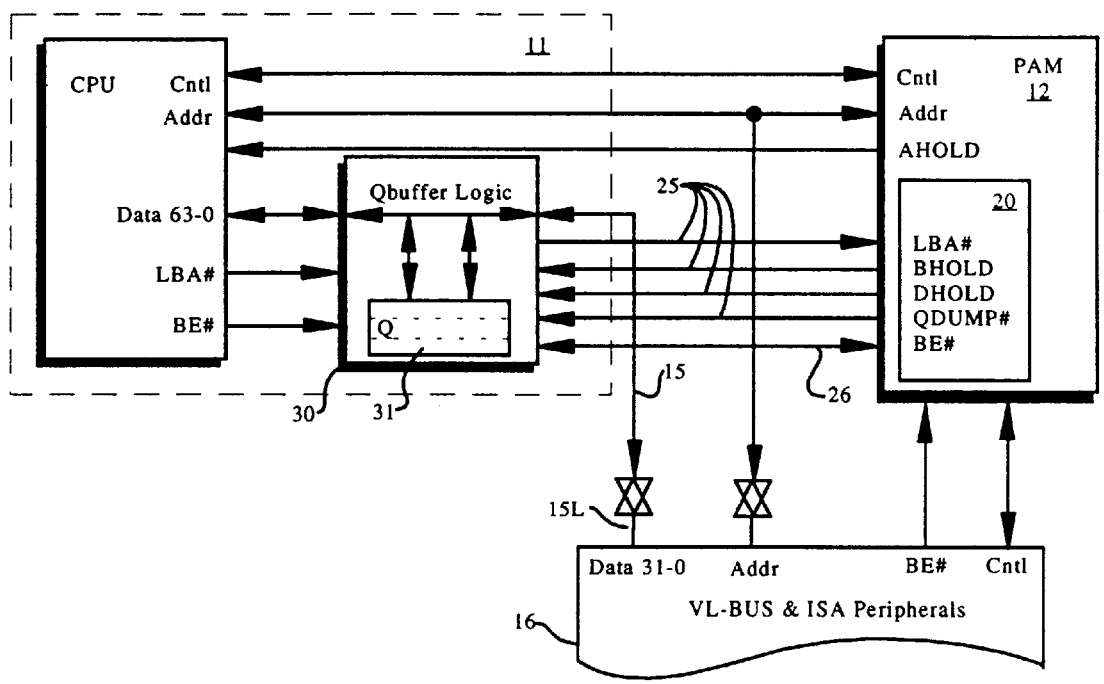

FIG. 2a illustrates the exemplary CPU-Peripheral bus interface, including internal (to the microprocessor) Qbuffer logic and Qbuffer protocol signaling by the M/B controller.

Figure 2B:
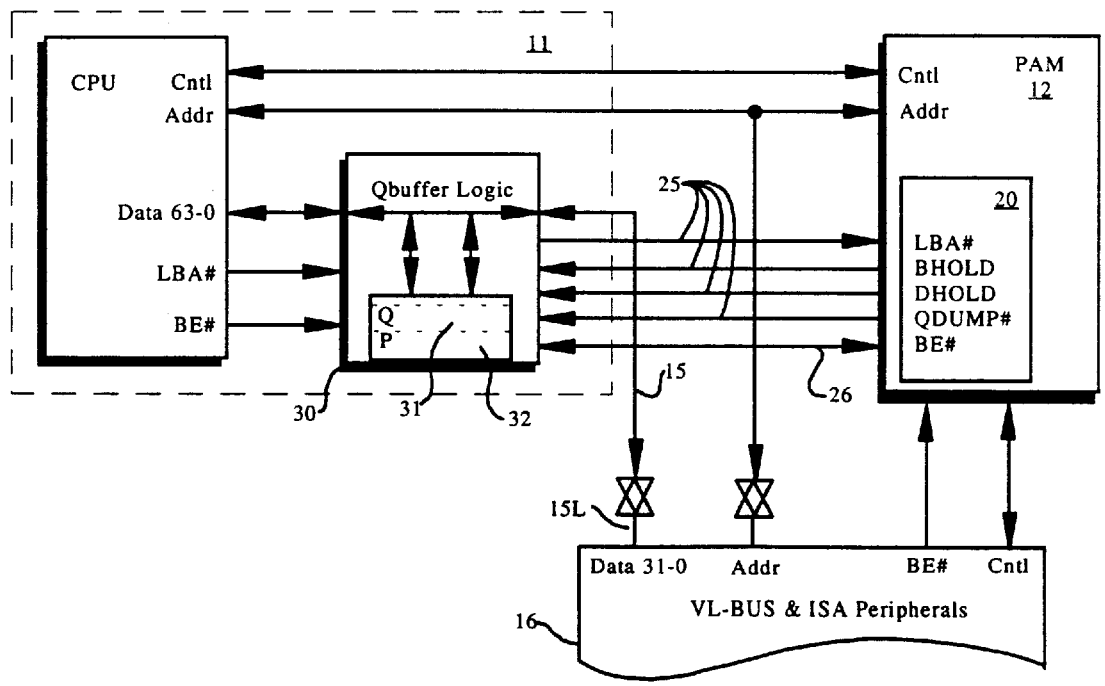

FIG. 2b illustrates an alternative embodiment of the CPU-Peripheral bus interface in which the Qbuffer logic includes both Qbuffer and Pbuffer registers.

Figure 2C:
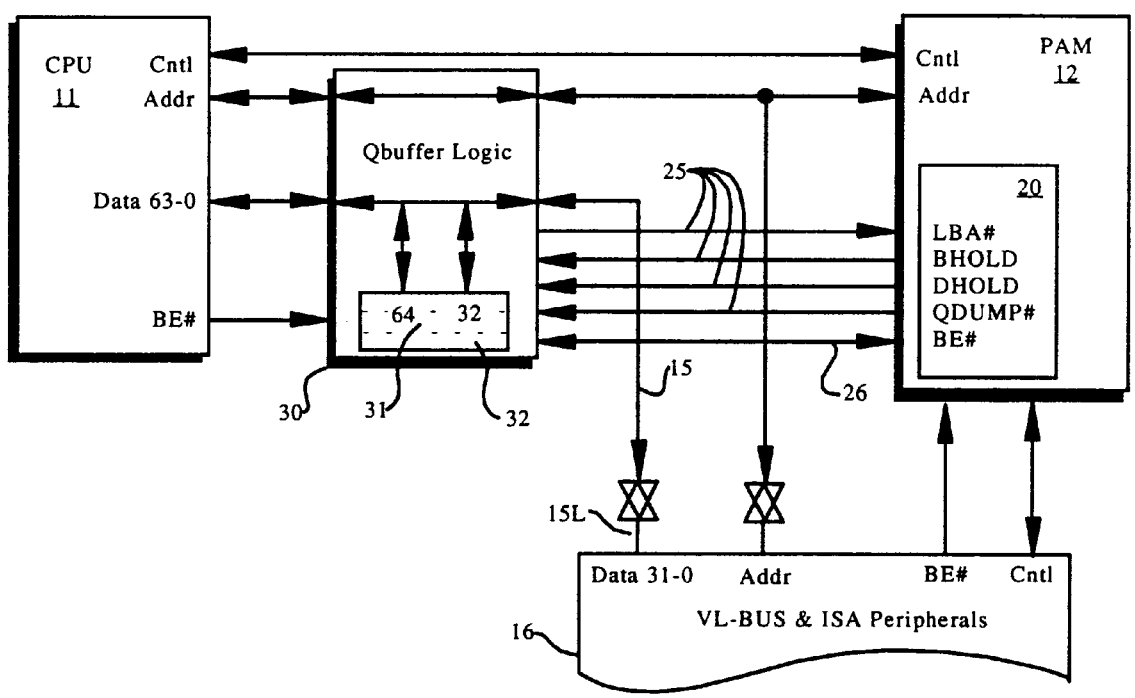

FIG. 2c illustrates another alternative embodiment of the CPU-Peripheral bus interface in which the Pbuffer and/or Qbuffer registers, and associated support logic, are located external to the microprocessor.

Figures 3A, 4A:
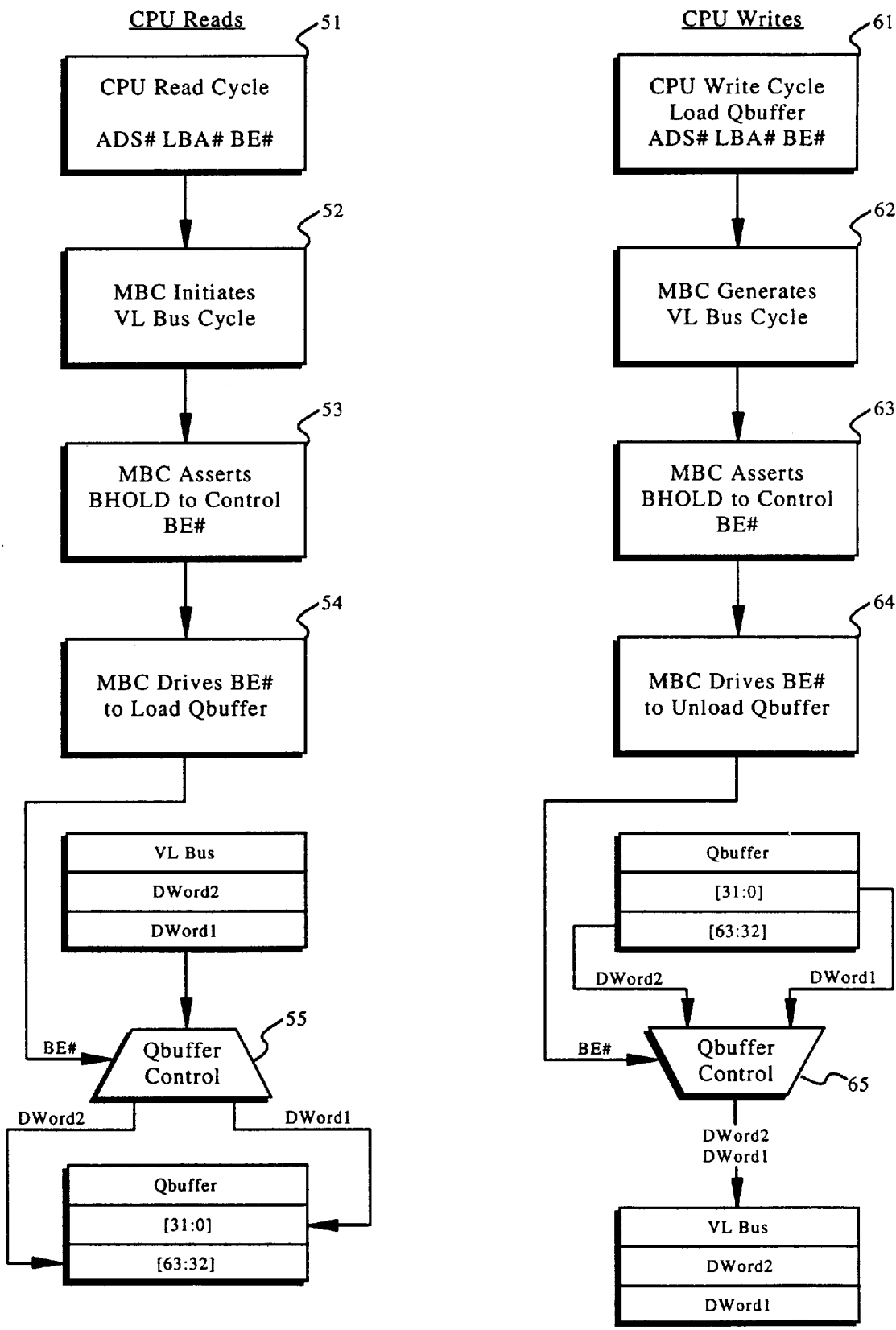
Figure 3B:
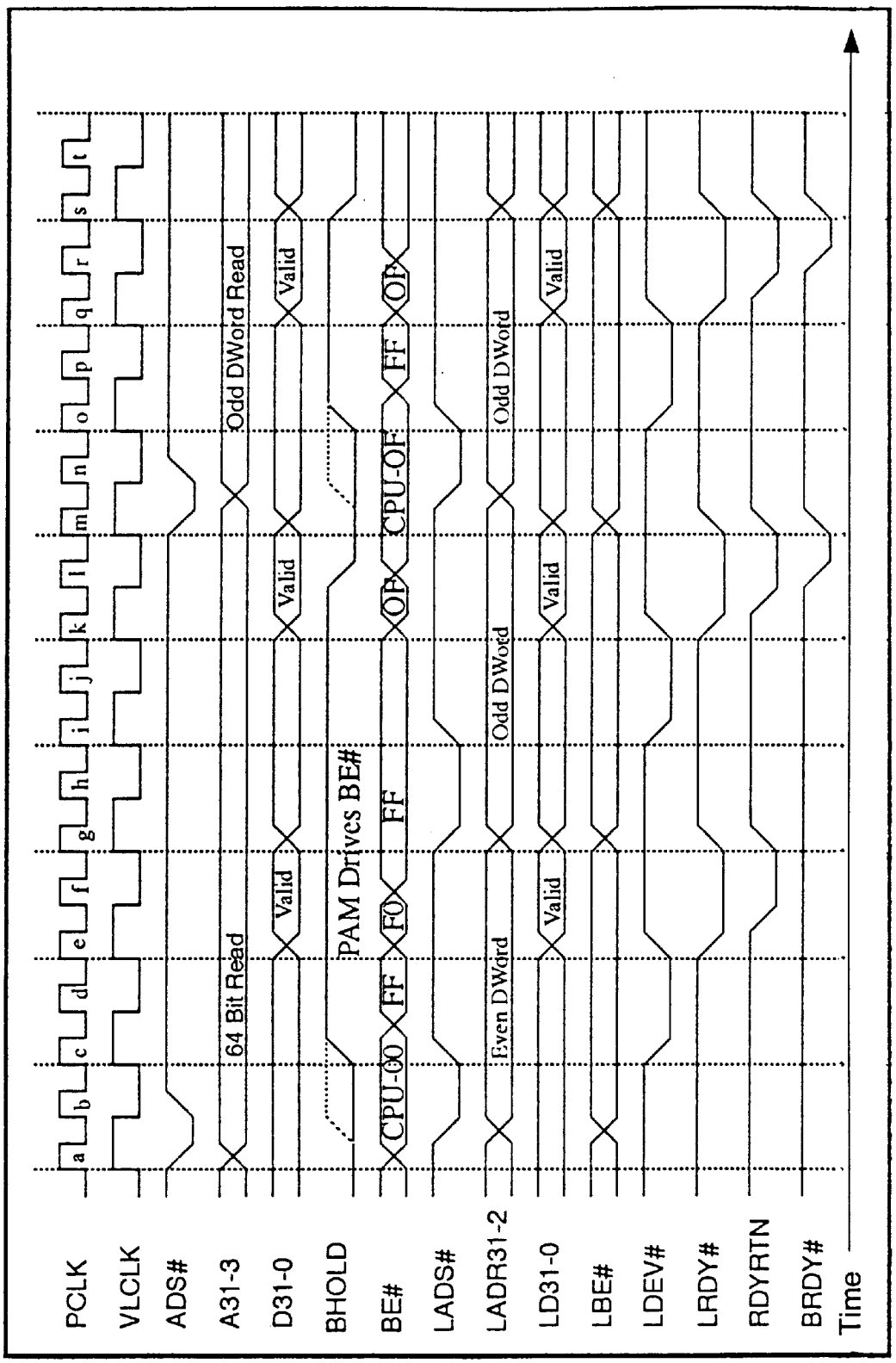

FIGS. 3a and 3b illustrate the exemplary Qbuffer protocol for CPU reads from the peripheral bus, including bus signaling (3b).

Figure 4B:
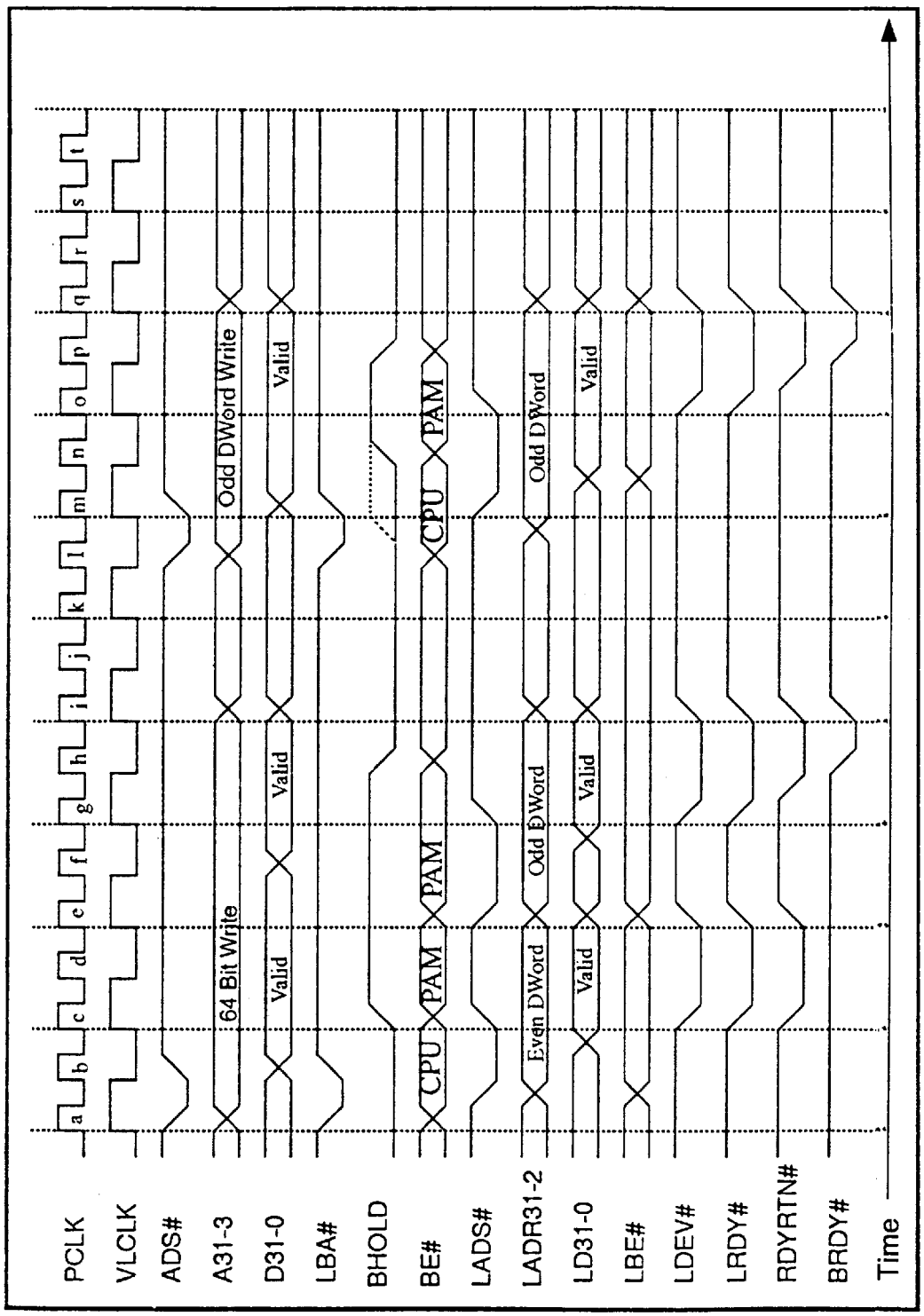

FIGS. 4a and 4b illustrate the exemplary Qbuffer protocol for CPU writes to the peripheral bus, including bus signaling (4b).

Figure 5A:
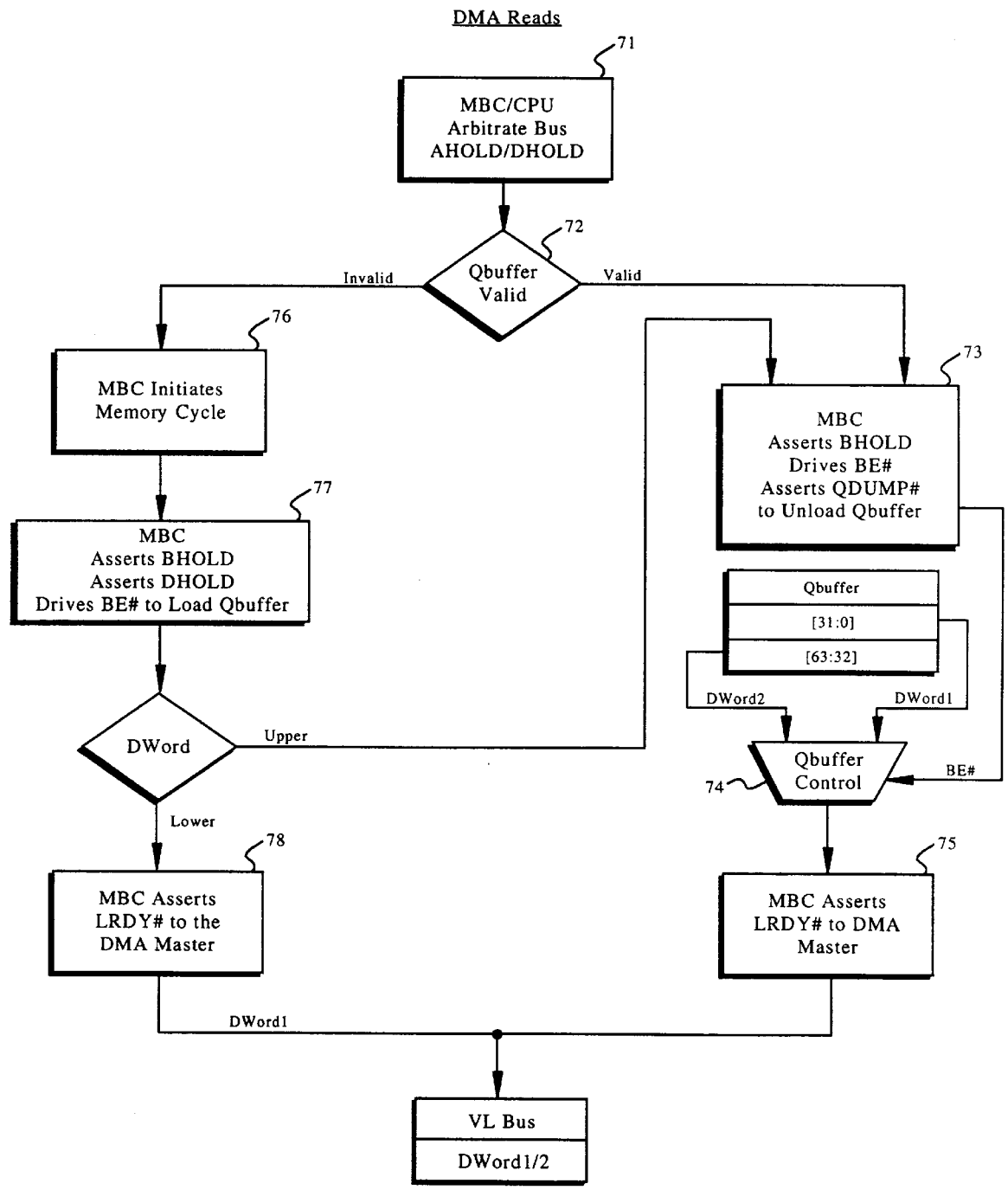
Figure 5B:
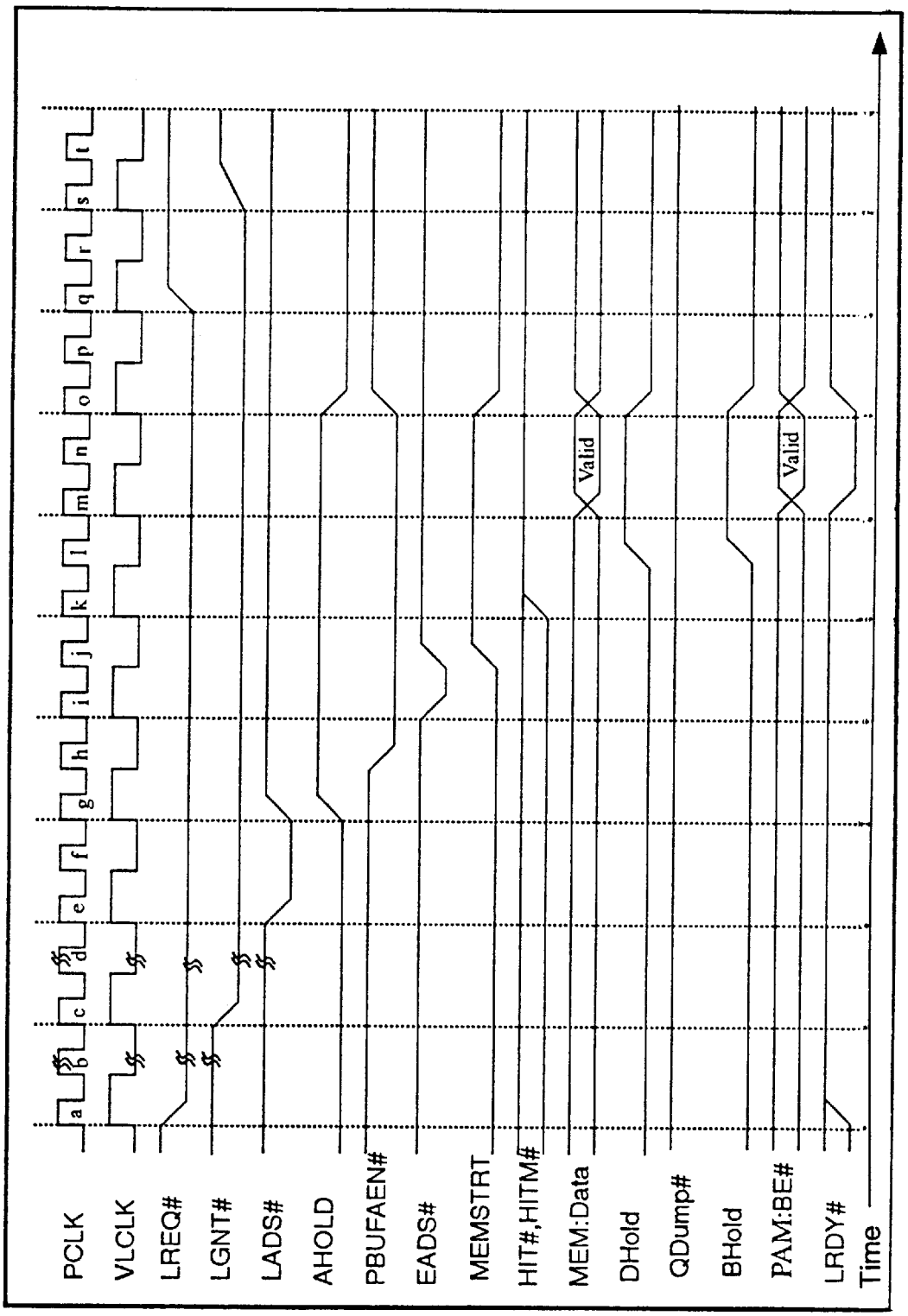
Figure 5C:
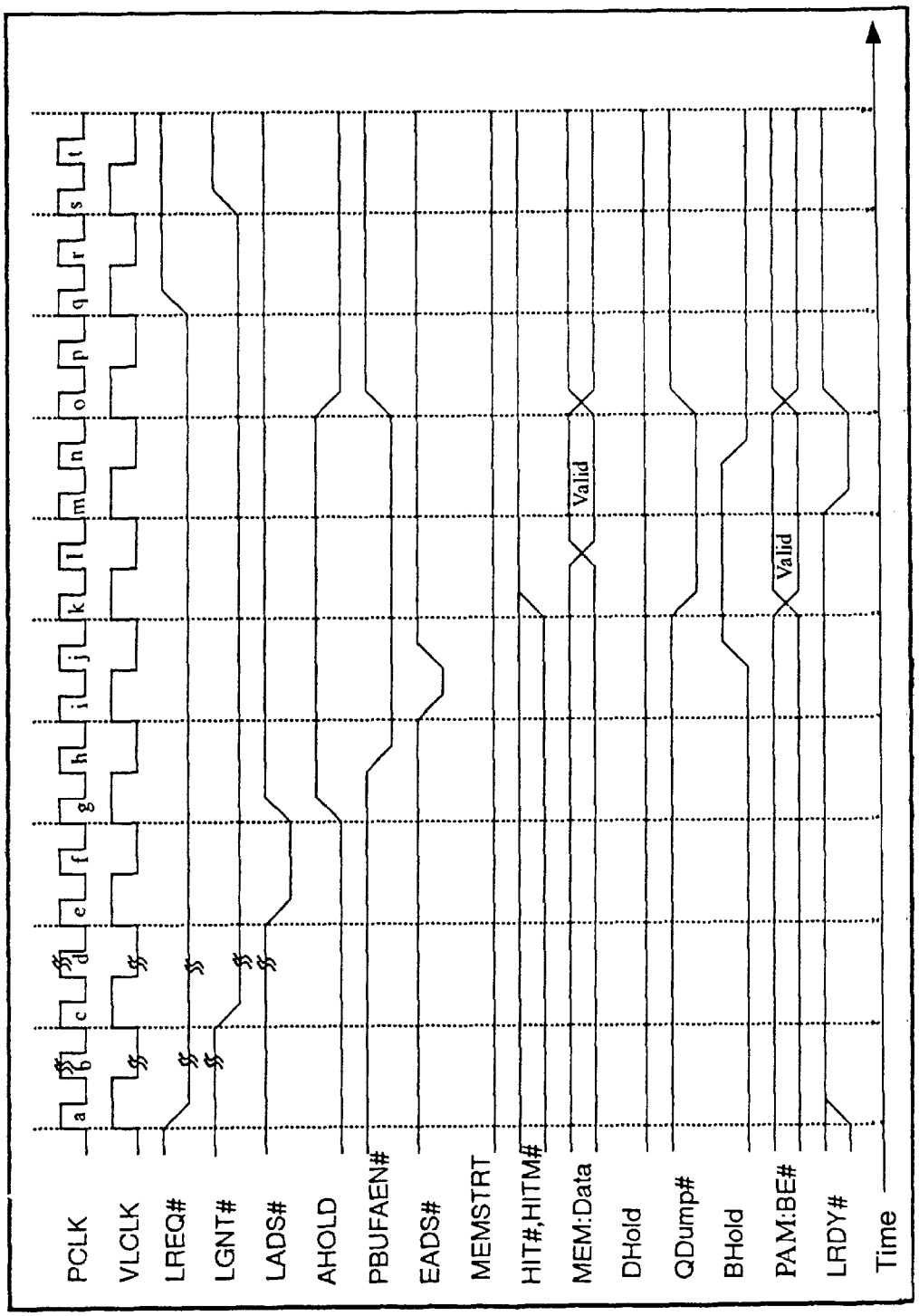

FIGS. 5a, 5b, and 5c illustrate the exemplary Qbuffer protocol for DMA reads, including bus signaling for lower dword [31:0] read (5b) and upper dword [63:32] reads (5c).

Figure 6A:
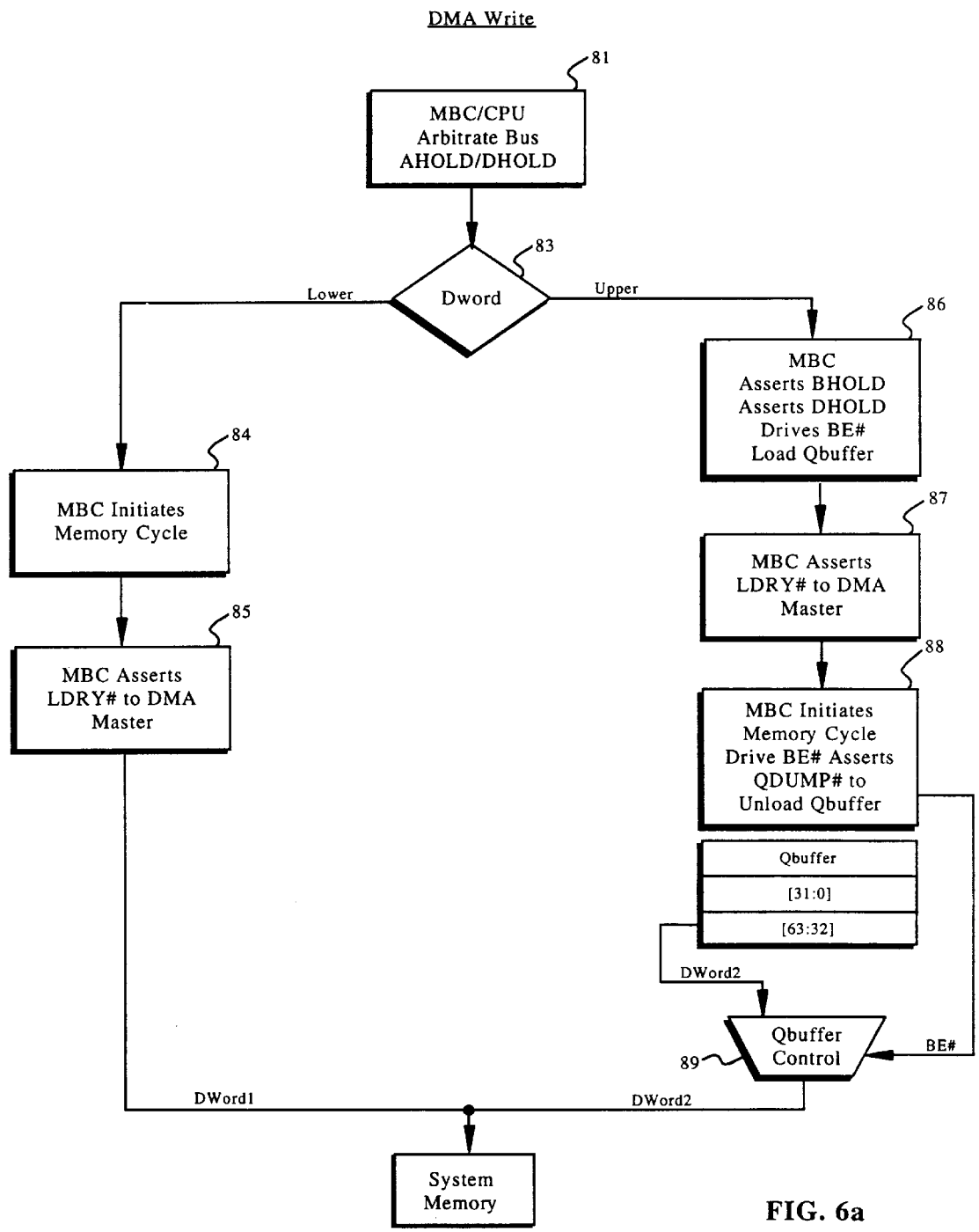
Figure 6B:
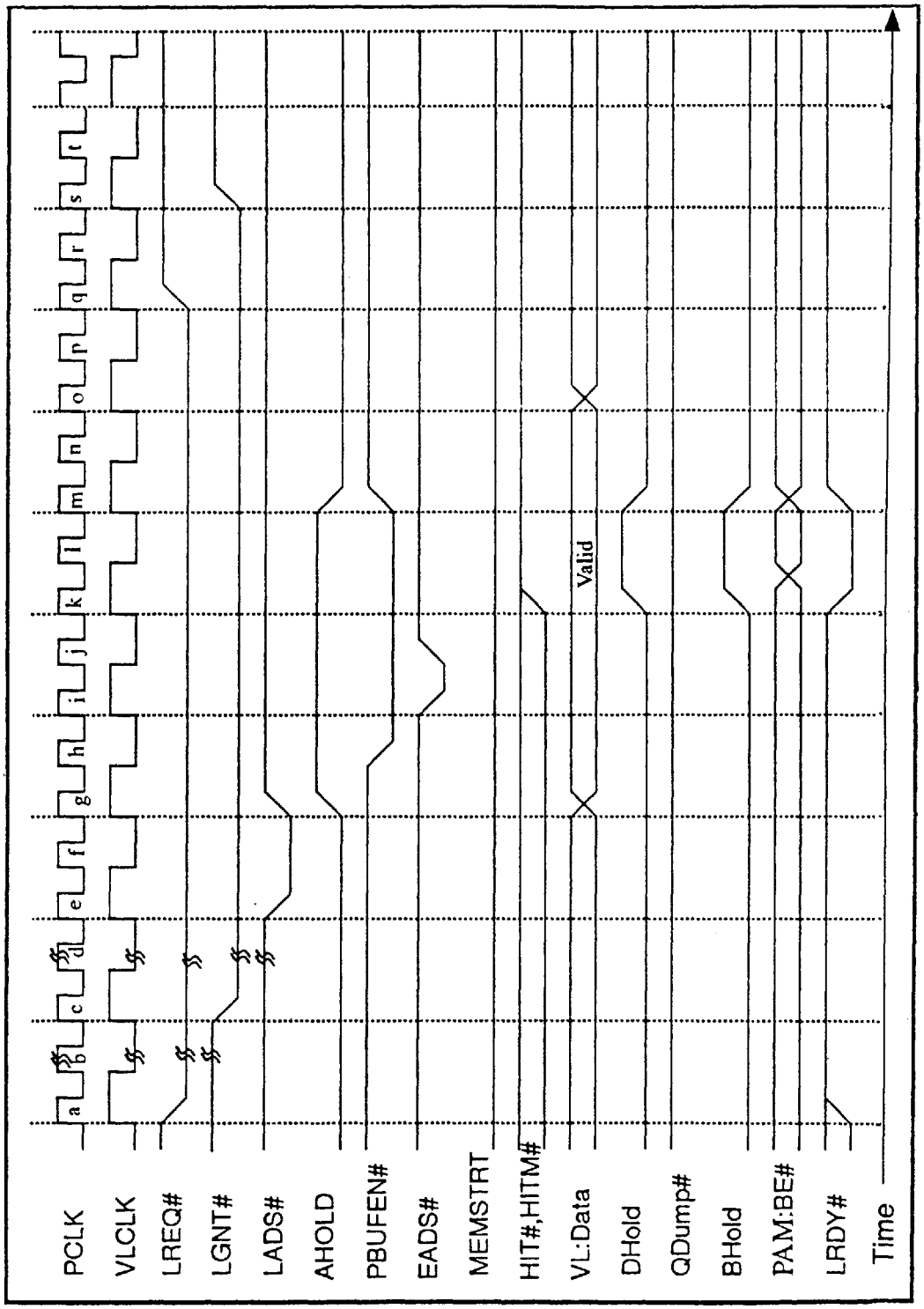
Figure 6C:
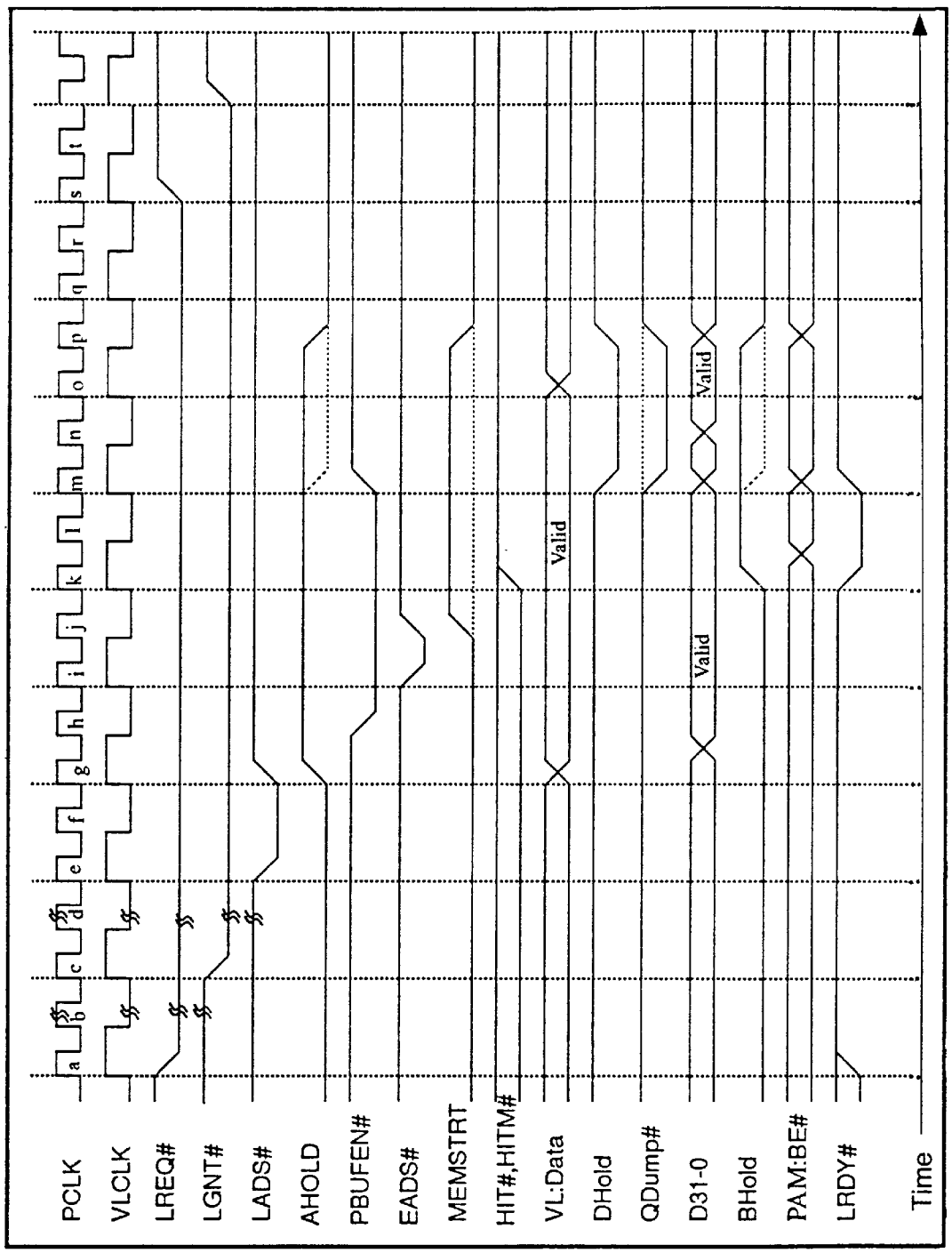

FIGS. 6a, 6b, and 6c illustrate the exemplary Qbuffer protocol for DMA writes, including bus signaling for lower dword [31:0] writes (6b) and upper dword [62:0] writes (6c).

DETAILED DESCRIPTION

The detailed description of an exemplary embodiment of the CPU-Peripheral bus interface including BE# signaling for lane steering, is organized as follows:
1. CPU-Peripheral Bus Interface
   1.1. 64/32 Bit System
   1.2. 32/32 Bit Upgradeable System
2. Qbuffer Logic
   2.1. P Buffer
   2.2. External Qbuffer Logic
3. Qbuffer Protocol
   3.1 Qcontrol Signals
   3.2 BE# Signaling
   3.3 BE# Sideband Signaling
   3.4 AHOLD/DHOLD Arbitration
4. CPU/DMA Operations
   4.1 CPU Reads
   4.2 CPU Writes
   4.3 DMA Reads
   4.4 DMA Writes
5. Conclusion
CPU Signal Descriptions—CPU Signal—CPU Signal Descriptions
MBC Signal Descriptions—MBC Signal Descriptions
This organizational outline, and the corresponding headings, are used in this Detailed Description for convenience of reference only.

The exemplary CPU-Peripheral bus interface including BE# signaling for lane steering is used in a computer system based on a 64-bit x86 class microprocessor, such as a Power586 microprocessor manufactured by Cyrix Corporation (the assignee of this invention)—the microprocessor is coupled to a 64-bit processor local bus, interfacing to a 32-bit VL peripheral bus. Detailed descriptions of conventional or known aspects of microprocessor-based computer systems are omitted so as to not obscure the description of the invention. In particular, terminology specific to the x86 microprocessor architecture (such as register names, signal nomenclature, pinout definition, bus signaling including addressing, bus cycle control/definition, arbitration, etc.) is known to practitioners in the microprocessor filed, as is the basic design and operation of such microprocessors and of computer systems based on them.

When used with a signal, the "#" symbol designates a signal that is active low, while the "/" symbol designates the complement of a signal.

1. CPU-Peripheral Bus Interface

FIG. 1a illustrates an exemplary 64/32 computer system 10 including a 64-bit microprocessor (CPU) 11 and associated memory/bus (M/B) controller 12. The microprocessor interfaces: (a) to a 64-bit processor local (system) bus 15, and (b) to a 32-bit peripheral bus 16.

The 64-bit local transfers 8 bytes, two dwords—the local bus defines 8 byte lanes or two 32-bit dword lanes. For the exemplary embodiment, the 32-bit peripheral bus interfaces to the low dword lane 15L of the local bus.

FIG. 1c illustrates an alternative embodiment of the computer system in FIG. 1a in which a 32-bit microprocessor is installed, and interfaced to the lower 32-bits of the 64-bit local bus (i.e., the low dword 15L interfaced to the peripheral bus). (See Section 1.2).

1.1. 64/32 Bit System

Referring to FIG. 1a, the M/B controller 12 interfaces the microprocessor 11 to system memory including DRAM 18 and Level 2 (L2) cache 19 over local bus 15, providing conventional bus cycle control for a 64-bit x86 bus architecture (including burst transfers and cache coherency control with bus snooping). For the exemplary embodiment, the M/B controller interfaces directly to a standard 32-bit VL peripheral bus, and through a standard VL/ISA converter to a standard 16-bit ISA peripheral bus In accordance with aspects of the invention, M/B controller 12 includes Qbuffer protocol logic 20 and microprocessor 11 includes Qbuffer control logic 30, that together comprise the CPU-Peripheral bus interface. The Qbuffer protocol logic and Qbuffer control logic implement a Qbuffer protocol, using Qcontrol signals 25, together with the byte enable signals BE#. The byte enable signals BE# are used for lane steering (multiplexing) between the 64 bit local bus and the 32 bit peripheral bus (see Section 2), performing data transfers over the low dword lane 15L.

The exemplary CPU-Peripheral bus interface, as implemented by the Qbuffer protocol, supports both CPU and DMA (direct memory access) initialed transfers.

FIG. 1b illustrates the computer system 10 in more detail, in particular showing the VL and ISA peripheral bus interfaces. A VL/ISA converter 42 (such as an HT321) provides standard interfaces to the 32 bit VL bus 43 and a 16 bit ISA bus 44. The VL/ISA converter interfaces to the 32 bit VL bus through a bidirectional 32/16 multiplexer 45 formed by dual high/low word [31:16]/[15:0] isolation buffers. The VL bus interfaces to standard VL slots 46, and through a bidirectional isolation buffer 48 to the low double word [31:0] 15L of the 64 bit processor local bus 15.

The exemplary computer system uses a 66 mhz system clock, with the processor local bus 15 running at 66 mhz, and the VL Peripheral bus running at either 33 or 40 mhz.

1.2 32/32 Bit System

Referring to FIG. 1c, the 64/32-bit computer system of FIG. 1a is configured with a 32-bit microprocessor (such as a 486DX). This exemplary 32/33 computer system illustrates how implementing a CPU-Peripheral bus interface using a M/B controller that supports the Qbuffer protocol facilitates the design of a computer system motherboard that will accept a low-cost 32-bit bit microprocessor but will be fully upgradeable to a 64-bit microprocessor.

For the 32/32 computer system, the microprocessor interfaces to the lower dword 15L of the 64-bit local bus 15. The DRAM 18 and L2 cache 19 are configured as 32 bit memory. The M/B controller is configured with the Qbuffer protocol logic 20 disabled (i.e., Qcontrol and BE# protocol signaling are disabled).

This alternate configuration functions as a normal 32-bit computer system. In particular, the CPU-Peripheral bus interface need only interface effectively a 32-bit local bus to the 32-bit VL peripheral bus. This peripheral bus interface does not require the Qbuffer protocol (i.e., does not require lane steering to multiplex a 64-bit processor local bus onto the 32-bit VL bus).

2. Qbuffer Logic

FIG. 2a illustrates the exemplary CPU-Peripheral bus interface, including Qbuffer logic 30. For the exemplary embodiment, the Qbuffer logic is internal to microprocessor 11.

Qbuffer logic 30 includes a 64-bit Qbuffer register Q (including a valid bit). The 64-bit (2dwords or 8 bytes) Qbuffer provides a hardware interface between the 64-bit processor local bus and the 32-bit VL peripheral bus.

In general, for CPU and DMA data transfers requiring lane steering, the multiplexing function is implemented by loading and unloading the Qbuffer with appropriate lane steering by the Qbuffer protocol. The Qbuffer protocol controls the loading and unloading of the Qbuffer, including performing necessary lane steering.

In accordance with one aspect of the invention, the M/B controller 12 implements the Qbuffer protocol in conjunction with the Qbuffer logic 30 using Q control signals 25 and byte enable signals 26. The Qcontrol signals are DHOLD, BHOLD, and QDUMP#. The byte enable signals are BE<7:0>#.

The Qbuffer protocol is described in detail in Section 3.

For the exemplary embodiment, Qbuffer 31 comprises a single 64-bit register. The Qbuffer logic could include additional registers—in particular, for some designs, it may be desirable to include at least two registers—one assigned to CPU transfers, and one assigned to DMA transfers.

2.1 Pbuffer

FIG. 2b illustrates an alternative embodiment of the CPU-Peripheral bus interface in which the Qbuffer logic 31 includes both q and P (processor) 64-bit registers 31 and 32. In this configuration, the Pbuffer 32 is used for all CPU transfers, and the Qbuffer 31 is used for DMA transfers.

2.2 DMA Read Cache

According to one aspect of the invention, using separate Q and P buffers allows the Qbuffer to act as a two dword cache for DMA reads. A DMA read of any size (byte, word, dword) results in the transfer of two dwords into the Qbuffer.

These DMA reads (such as for a floppy disk) tend to be contiguous, but relatively slow. With a separate Qbuffer that is not overwritten by intervening CPU transfers (which now would use the Pbuffer), contiguous DMA transfers can be handled over a number of bus cycles without being affected by an intervening CPU transfers.

The separate Q buffer would also facilitate DMA write gathering, although DMA write gathering is not implemented in the exemplary embodiment (see, Section 4.4). The design trade-off is increased complexity versus reduced bus traffic.

This design could be further extended by increasing the number of Qbuffer registers (in effect, enlarging the DMA read cache). For example, using four registers would enable an entire cache line to be stored, such that transfers between the Qbuffer and system memory could be performed as burst transfers.

Implementing separate P and Q buffers, and specifying the number of Qbuffer registers involves a design tradeoff between expected performance benefit, and associated cost.

2.3 External Q/P Buffer

FIG. 2c illustrates another alternative embodiment of the CPU-Peripheral bus interface in which the Qbuffer logic is located external to the CPU—the external Qbuffer logic can include P and/or Q registers. Note that the address bus is interfaced to the Qbuffer logic.

3. Qbuffer Protocol

Referring to FIG. 2a, M/B controller 12 implements the exemplary Qbuffer protocol in conjunction with the Qbuffer logic 30 in microprocessor 11. The Qbuffer protocol uses Qcontrol signals 25, and byte enable BE# signals 26.

Section 4 provides a detailed description of exemplary CPU/DMA operations according to the Qbuffer protocol.

3.1 Qcontrol Signals

The exemplary Qcontrol signals are DHOLD, BHOLD, and QDUMP#.

DHOLD is asserted by the M/B controller during DMA accesses—it causes the microprocessor to tristate its local (data) bus lines (and the data parity lines)in the next clock. The current CPU bus cycle remains active, and is completed in the normal fashion in response to BRDY#—thus, BRDY# should not be asserted while DHOLD is asserted to avoid writing invalid data.

With DHOLD asserted, the data bus is driven by the DMA master, and the data is loaded into the Qbuffer, with lane steering provided by BE# signaling from the M/B controller (see, Section 3.2).

In addition, DHOLD is used in connection with the AHOLD to provide a bus arbitration protocol for DMA accesses as described in Section 3.3.

BHOLD is asserted by the M/B controller during DMA and CPU data transfers—it causes the microprocessor to tristate its byte enable control lines BE#<7:0>, allowing the M/B controller to perform BE# signaling by driving designated byte enable codes into the Qbuffer control logic 30. The current bus cycle remains active, and can be completed in the normal fashion by returning BRDY# (AHOLD should be asserted during BHOLD).

BE# signaling implements lane steering during loading (DHOLD asserted) and unloading (QDUMP# asserted) the Qbuffer. The BE# mapping for Qbuffer load/unload cycles is given in Section 3.2.

QDUMP# is asserted by the M/B controller during DMA accesses in which the Qbuffer logic is used to provide lane steering. The Qbuffer is unloaded to the local (data) bus during the next bus cycle, with lane steering provided by BE# signaling.

3.2 BE# Signaling

According to one aspect of the invention, lane steering for loading and unloading the Qbuffer is effect by BE# (byte enable) signaling using the BE#<7:0> byte enable control lines. BE# signaling effects multiplexing between the local bus and the peripheral bus by steering the upper dword transfers between the upper dword lane of the local bus and the lower dword lane of the local bus, which is coupled to the VL bus.

After assertion of the Qcontrol signal BHOLD, the M/B controller 12 is able to drive BE# signals (codes) into the Qbuffer control logic 30. Lane steering is accomplished according to exemplary BE# encodings.

For the exemplary Qbuffer protocol, the following table gives the BE# encoding map for lane steering:

| CYCLE TIME | BE7-BE0# | SOURCE | DESTINATION |
|---|---|---|---|
| CPU Read from 32-Bit VL Bus | | CPU Data Bus | Qbuffer |
| | FF | No Transfer | No Transfer |
| | Fx | 31-0 | 31-0 |
| | xF | 31-0 | 63-32 |
| | xx | 63-0 | 63-0 |

-continued

| CYCLE TIME | BE7-BE0# | SOURCE | DESTINATION |
|---|---|---|---|
| CPU Write to 32-Bit VL Bus* | | Qbuffer | CPU Data Bus |
| | FF | No Transfer | No Transfer |
| | Fx | 31-0 | 31-0 |
| | xF | 63-32 | 31-0 |
| | xx | 63-0 | 63-0 |
| Qbuffer Load for 32-Bit DMA Master | | CPU Data Bus | Qbuffer |
| | FF | No Transfer | No Transfer |
| | Fx | 31-0 | 31-0 |
| | xF | 31-0 | 63.32 |
| | xx | 63-0 | 63-0 |
| Qbuffer Unload using QDUMP# | | Qbuffer | CPU Data Bus |
| | FF | No Transfer | No Transfer |
| | Fx | 31-0 | 31-0 |
| | xF | 63-32 | 31-0 |
| | xx | 63-0 | 63-0 |

*Note:
If LBA# is active during a CPU write cycle with BE3-BE0# inactive, the CPU automatically maps the upper dword of data (D63-D32) to the lower dword of the data bus (D31-D0).

Qbuffer loading occurs during CPU read, and DMA accesses (DHOLD asserted) in which lane steering is required—for DMA reads of a low dword [31:0], lane steering i s not required, and the Qbuffer is not loaded (lane steering is also not required for DMA writes to a low dword, but for the exemplary embodiment, the Qbuffer is loaded). The Qbuffer is only loaded with bytes enabled by the BE# signals.

Note that BE# [xF] and [Fx] are used for steering BE# [00] is used to load 64 bits from system memory for DMA reads.

Qbuffer unloading occurs during CPU writes, and DMA accesses (QDUMP# asserted) in which lane steering is required— as with Qbuffer loading, for DMA accesses (reads and writes) of a low dword [31:0], lane steering is not required, and the Qbuffer is not used.

Note that BE#[xF] and [Fx] are used for steering—BE# [Fx] unloads all 64 bits, even though only the low dword is actually transferred. BE#[00] is used to unload 64 bits to system memory for DMA writes—BE#[FF] won't occur in the exemplary implementation.

BE<7:0># provides 256 possible encodings. Thus, sufficient encodings are available to accommodate any practical configuration of P/Qbuffer registers, including one with a Pbuffer register and multiple Qbuffer registers.

Alternatively, other signaling means, such as separate control lines, could be used for lane steering.

3.3 BE Sideband Signaling

According to one aspect of the invention, the BE# signaling protocol can be generalized to provide BE# sideband signaling for communications between the system and the CPU.

Using spare encodings, the M/B controller can communicate with the microprocessor by asserting AHOLD (to prevent the microprocessor from initiating a bus cycle) and BHOLD (to obtain control of the BE# lines), and then driving BE# sideband signaling codes into the microprocessor. BE# sideband signaling can be implemented separately, or in conjunction with the Qbuffer protocol.

3.4 AHOLD/DHOLD Arbitration

In accordance with one aspect of the invention, for DMA accesses, the M/B controller implements a bus arbitration protocol using the conventional AHOLD signal and the Qcontrol signal DHOLD.

In the x86 bus architecture, AHOLD (Address Hold Request) is a cache coherency control signal. AHOLD is asserted by the M/B controller during bus snooping operations to cause the CPU to tristate its address lines, allowing a DMA master to drive addresses to the CPU as well as to system memory. The CPU does not generate additional bus cycles while AHOLD is asserted, except for write-back cycles in response to a cache inquiry cycle. The current bus cycle remains active, and can be completed in the normal fashion.

In accordance with the AHOLD/DHOLD bus arbitration protocol, to effect a DMA access, the M/B controller asserts AHOLD to the CPU, causing the CPU to relinquish control of the address lines without terminating a current bus cycle. DHOLD to the CPU, causing the CPU to relinquish control of the address lines without terminating a current bus cycle. DHOLD can be asserted to the CPU to obtain control of the local bus if needed (for Qbuffer loading).

For the exemplary CPU-Peripheral bus interface, the AHOLD/DHOLD protocol is used to effect Qbuffer loading during DMA accesses (see, Sections 3.3 and 3.4). To load the Qbuffer, the M/B controller asserts DHOLD and drives BE# codes into the CPU to effect lane steering. If the DMA access requires unloading the Qbuffer, the M/B controller asserts QDUMP# and drives BE# signals to cause the CPU/Qbuffer logic to output data from the Qbuffer with appropriate lane steering (i.e., the CPU drives the local bus).

The AHOLD/DHOLD bus arbitration protocol is advantageous for DMA transfers in that the DMA access request can be serviced without waiting for a current CPU bus cycle to complete (as is the case with HOLD/HLDA), but does not require a current bus cycle to be aborted and restarted (as is the case with BOFF#).

The AHOLD/DHOLD bus arbitration protocol is a general protocol that can be used in applications other than implementing the exemplary CPU-Peripheral bus interface. Moreover, the exemplary Qbuffer protocol can be used with other bus arbitration protocols (such as HOD/HLDA and BOFF#).

4. CPU/DMA Operations

In accordance with aspects of the invention, the Qbuffer protocol (Q control signals and BE# signaling), used in conjunction with the AHOLD/DHOLD bus arbitration protocol, implements the exemplary CPU-Peripheral bus interface. The Qbuffer protocol is used to control associated lane steering) for CPU-initiated and DMA data transfers.

To improve performance for CPU Read/Write cycles, the exemplary microprocessor provides and additional bus cycle definition signal—LBA#.

LBA# is asserted by the CPU to the M/B controller when the CPU detects an access to a region programmed as I/O in on-chip region control registers (such as for memory-mapped I/O)—that is, for local bus accesses other than those to system memory. In addition, all I/O cycles (signaled to the M/B controller by M/IO#), except for those assigned to the internal control registers for the M/B controller, are directed to the VL bus. LBA# eliminates the need for the M/B controller to implement these region control registers and the associated decode logic to detect those VL bus accesses not signaled by M/IO#.

CPU/DMA transfer operations according the exemplary Qbuffer protocol are summarized in the following table;

State e: VL-Bus target device can assert LRDY#. Additional wait states would be inserted here. Local data can start becoming active.

State e: After the VL-Bus target device returns LRDY#, the M/B controller asserts RDYRTN#, and sets BE#=FOh so that the CPU will load LD31-0 into bits 31-0 of the Qbuffer.

State g: The M/B controller initiates a second LLADS# to the VL-BUS, with BE#=OFh.

State l: This time the M/B controller asserts BRDY#, causing the CPU to load the Qbuffer with LD31-0 bits 63-32. In addition the CPU moves the contents of the Qbuffer onto its internal bus.

State m–t: For 32 bit accesses, only one LADS# cycle is generated by the M/B controller.

| CYCLE TYPE | BHOLD | DHOLD | QDUMP# | DATA BUS TIMING |
|---|---|---|---|---|
| CPU Write to 32-Bit VL Bus | x | — | — | Data driven 1 clock after byte enables asserted |
| CPU Read from 32-Bit VL Bus | x | — | — | Data sampled 1 clock after byte enables asserted |
| 32-Bit DMA Master Write to Memory* | | | | |
| (1) Qbuffer load from 32-bit DMA master. | x | x | — | Data sampled 1 clock after byte enables asserted. |
| (2) Qbuffer write to memory. | x | — | x | Data driven 1 clock after QDUMP# asserted. |
| 32-Bit DMA Master Read from Memory* | | | | |
| (1) Qbuffer load from memory. | x | x | — | Data sampled 1 clock after byte enables asserted. |
| (2) Qbuffer write to 32-bit DMA master | x | — | x | Data driven 1 clock after QDUMP# asserted. |

*Note:
Bus master transfers using the Qbuffer must be initiated while the local bus is in a bus hold or idle state. These cycles cannot occur during CPU initiated bus cycles.

4.1 CPU Reads

FIG. 3a generally illustrates the exemplary Qbuffer protocol for CPU reads from the peripheral bus. For CPU reads, up to two dwords (depending on the byte enables) are transferred from the VL peripheral bus to the Qbuffer, with appropriate lane steering—the CPU is then signaled to read the two dwords from the Qbuffer.

The CPU initiates a read cycle (51) asserting ADS# and LBA# (indicating a VL bus access), and driving out BE#. In response, the M/B controller initiates a VL bus cycle (52).

Coincidentally, the M/B controller asserts BHOLD (53) to obtain control of the BE# lines. In connection with the transfer from the VL bus, the M/B controller drives BE# to load the Qbuffer (54). Specifically, using BE# signaling, the M/B controller controls (55) lane steering by loading the Qbuffer with the low dword [3:10] and then the high dword [63:32] from the VL bus (via the low dword lane of the local bus).

The CPU then reads the data out of the Qbuffer in response to BRDY#.

FIG. 3b illustrates the exemplary bus signaling for CPU reads in accordance with the Qbuffer protocol. Both lower and upper Dword reads take 6 PCLKs.

State a: CPU asserts ADS# & LBA#, and the M/B controller passes ADS# and the address directly to VL-BUS. CPU drives BE#. The M/B controller generates ADR2 and BLE# and BE#.

State c: M/B controller asserts BHOLD to control the BE# lines for Qbuffer operation. VL-Bus target device asserts LDEV#.

4.2 CPU Writes

FIG. 4a generally illustrates the exemplary Qbuffer protocol for CPU writes to the peripheral bus. For CPU writes, the CPU transfers up to two dwords (depending on the byte enables) into the Qbuffer—in successive bus cycles, the lower dword and then the upper dword are steered to the VL peripheral bus.

The CPU initiates a write cycle (61) by first loading data into the Qbuffer, and then asserting ADS# and bus access), and driving out BE#. In response, the M/B controller generates a VL bus cycle (62) addressed to the target device.

Coincidentally, the M/B controller asserts BHOLD (63) to obtain control of the BE# lines. In connection with the transfer to the VL bus, the M/B controller drives BE# to unload the Qbuffer (54) over the low dword [31:0] lane of the local bus to the VL bus. Specifically, by the appropriate selection of BE#, the M/B controller controls (65) steering of the low dword [31:0] and then the high dword [63:32] from the Qbuffer to the VL bus (via the low dword lane of the local bus).

FIG. 4b illustrates the exemplary bus signaling for CPU writes in accordance with the Qbuffer protocol. This operation assumes that the VL-Bus address is in the CPU's RCR. Both even and odd Dword writes take 2 PCLKs.

State a: CPU asserts ADS# & LBA# (VL-Bus Access). The M/B controller passes ADS# through as LADS# to VL-Bus.

State c: M/B controller asserts BHOLD to control BE# lines for Qbuffer operation. VL-Bus target device asserts LDEV#, and can assert LRDY#. Additional wait states would be inserted here. Write Data must be valid by the rising edge of state e. The M/B controller echoes back RDYRTN# in the same state, and sets BE#=Fxh to hold the Qbuffer data on the bus. Note that the CPU and the M/B controller are driving BE# to the same value.

State e: M/B controller switches the BE# lines for the second transfer, setting BE#=xFh so that the QBuffer will write bits 63-32 to LD31-0.

State h: Asserting BRDY# tells the CPU that the cycle is over.

State h: BHOLD is deasserted one clock before the CPU needs the bus. Data Stays valid until the State i.

State l: A second ADS# occurs on VLCLK#. The M/B controller holds off LADS# until the next VLCLK.

State m: The Qbuffer unloads the upper dword to the local bus.

State o: M/B controller sets BE#=xFh to get t he data on the bus.

State q–t: For 32 bit accesses, only one LADS# cycle is generated by the M/B controller.

4.3 DMA Reads

FIG. 5a generally illustrates the exemplary Qbuffer protocol for DMA reads from system memory.

In response to a DMA device requesting a DMA read, the M/B controller and microprocessor arbitrate for local bus control (71) using the exemplary AHOLD/DHOLD bus arbitration protocol. For the exemplary embodiment, the M/B controller arbitrates for control by asserting AHOLD to (a) interrupt a current CPU bus cycle, and (b) obtain control of the address lines—DHOLD is asserted if the DMA read requires loading the Qbuffer (requiring control of the local bus).

Once the bus has been arbitrated to the M/B controller, the protocol for effecting the DMA read depends on whether the addressed data has been previously loaded into the Qbuffer and is still valid (72). Specifically, a DMA read can be serviced out of the Qbuffer without requiring an access to system memory if: (a) a previous DMA read resulted in the appropriate data being loaded into the Qbuffer, and (b) the data in the Qbuffer is not dirty (invalid) because of a prior CPU write to the corresponding addressing system memory.

If the DMA read can be serviced out of the Qbuffer without accessing system memory, then the M/B controller asserts BHOLD and QDUMP#, and drives BE# (73) to unload (74) the appropriate dword (low or high) to the local bus for transfer to the VL bus (via the low dword lane of the local bus). To effect the transfer to the DMA master, the M/B controller asserts LRDY# (75).

If valid data is not in the Qbuffer, then the M/B controller initiates a memory cycle (76), and coincidentally, asserts BHOLD and DHOLD, and drives BE# to load (77) the Qbuffer from system memory.

If the addressed data is in the low dword, then concurrently with Qbuffer loading, the M/B controller asserts LRDY# to the DMA master (78), and the data is transferred to the VL bus (via the low dword lane of the local bus). If the addressed data is in the upper dword, then after Qbuffer loading, the M/B controller unloads the upper dword from the Qbuffer (73) to the VL bus.

FIG. 5b illustrates the exemplary bus signaling for low dword DMA reads in accordance with the Qbuffer protocol State a: VL Bus device requests VL-Bus for a DMA read.

State c: M/B controller can grate the bus the next VL-Bus state (Wait states can be inserted).

State e: DMA master asserts its address strobe LADS#.

State f & g: M/B controller senses LADS# and asserts AHOLD to control address bus if no other bus cycles are pending.

State h: M/B controller turns on the address buffers from the VL-BUS.

State i: M/B controller asserts EADS# to the CPU so a snoop can be performed. The INVAL line is asserted with EADS#.

State j: M/B controller starts a memory cycle with the DRAM.

State k: The results of the cache snoop occur in this state—if HITM# was valid then the CPU would have started a write-back cycle at this point.

State l: M/B controller asserts DHOLD and BHOLD. If a write-back cycle was going to occur then the M/B controller would abort its Qbuffer cycle by releasing DHOLD and BHOLD the next state.

State m & n: The results of the DRAM read start becoming valid. The M/B controller asserts BE#=OOh so that 64 bits of data are loaded into the Qbuffer, and then asserts LRDY# to the DMA master. This signal could be delayed by one VLCLK cycle. The VL-BUS data buffers are turned on so that the lower 32-bits can be transferred directly to the VL-BUS.

State o: DRAM data is loaded into the Qbuffer and transferred to the DMA master. The M/B controller releases the CPU from the Qbuffer cycle by deasserting AHOLD & DHOLD.

State q: The DMA master can relinquish its control of the VL bus at this time or start another transfer. Note that the local bus is free at this point. FIG. 5c illustrates the exemplary bus signaling for upper dword DMA reads in accordance with the Qbuffer protocol.

State a–j: The same as in FIG. 5b.

State k: The results of the cache snoop occur in this state. Since this is the second read of the 64 bit word, a HITM# should never occur.

State l: M/B controller asserts DHOLD and BHOLD and drives BE#. If BE# is Fxh then the lower 32 bits of the local bus will be transferred to D31-D0. If BE# is xFh then the upper 32 bits of the local bus will be transferred to D31-Do.

State m: M/B controller asserts LRDY# to the DMA master—this signal could be delayed by one VLCLK cycle. The VL-BUS data buffers are turned on so that the lower 32-bits can be transferred directly to the VL-BUS.

State o: Qbuffer data is latched onto the VL-Bus and by the DMA master. The M/B controller releases the CPU from the DMA cycle by deasserting AHOLD and QDUMP#.

State q–t: The same as in FIG. 5b.

4.4 DMA Writes

FIG. 6a illustrate the exemplary Qbuffer protocol for DMA writes to system memory.

In response to a DMA device requesting a DMA write, the M/B controller arbitrates for control by asserting AHOLD to (a) interrupt a current CPU bus cycle, and (b) obtain control of the address lines—DHOLD is asserted if the DMA write requires loading the Qbuffer (requiring control of the local bus).

Once the local bus has been arbitrate to the M/B controller, the exemplary protocol for completing a DMA write depends on whether the data is a lower or upper dword (83).

For DMA writes of a lower dword, the M/B controller initiates a memory cycle (84), and the returns LRDY# (85) to the DMA master. The lower dword data is then transferred from the DMA master to system memory over the VL bus (via the low dword lane of the local bus).

For the exemplary Qbuffer protocol, DMA writes of a lower dword are not loaded into the Qbuffer because no lane steering is required, and write gathering i snot implement.

For DMA writes to an upper dword, the M/B controller (a) loads the Qbuffer (86) by asserting BHOLD and DHOLD, and driving BE#, and the (b) returns LRDY# (87) to the DMA master. The upper dword is loaded into the Qbuffer, with appropriate lane steering provided by BE#.

To complete the DMA write, the M/B controller initiates a memory cycle (88), driving BE# (BHOLD asserted, DHOLD deasserted) and asserting QDUMP# to unload the upper dword onto the local bus (89) for transfer to system memory.

For the exemplary Qbuffer protocol, DMA writes are not gathered into the Qbuffer for transfer in a single memory cycle to system memory. Instead, in each DMA write cycle, any valid data in the Qbuffer is transferred to system memory. This implementation represents a design trade-off—the exemplary embodiment could be extended implement write gathering for DMA writes.

FIG. 6b illustrates the exemplary bus signaling for odd dword DMA writes in accordance with the CPU-Peripheral bus interface protocol.

State a–i: The same as in FIG. 5b.

State j: M/B controller determines that the Qbuffer is empty and doesn't start a memory cycle with the DRAM.

State k: The results of the cache snoop occur in this state. If HITM# was valid then the CPU would have started a write-back cycle at this point. The M/B controller asserts DHOLD & BHOLD. If a write-back cycle was going to occur, then the M/B controller would abort its DMA cycle by releasing DHOLD in the next state. The M/B controller asserts LRDY# to the DMA master. The VL-BUS data buffers are turned on so that the lower 32-bits can be transferred directly from the VL-BUS.

State k#: M/B controller asserts BE#. BE#=xFh transfer 32 bits from the VL-Bus to bits 63-32 of the Qbuffer. BE#=Fxh transfers 32 bits from the VL-Bus to bits 31-0 of the Qbuffer.

State m: Qbuffer latches the 32 bit VL-Bus transfer.

State n–v: DMA master can relinquish control of the VL bus at this time or start another transfer. Note that the CPU bus is free at this point.

FIG. 6c illustrates the exemplary bus signaling for even dword DMA writes in accordance with the CPU-Peripheral bus interface protocol.

State a–i: The same as in FIG. 5b.

State j: M/B controller starts a write memory cycle with the DRAM if it determines that the Qbuffer needs to be unloaded.

State k-state m: The same as in FIG. 6b.

State m: If the M/B controller needs to unload the Qbuffer it won't release AHOLD or BHOLD at this point, but instead will assert QDUMP# and set BE#=xxh. This will cause the Qbuffer to get written to DRAM in State P.

5. Conclusion

Although the Detailed Description of the invention has been directed to certain exemplary embodiments, various modifications of these embodiments, as well as alternative embodiments, will be suggested to those skilled in the art.

For example, specific register structures, mappings, bit assignments, and other implementation details are set forth solely for purposes of providing a detailed description of the invention.

Also, references to dividing data into bytes, words, double words (dwords), quad words (qwords), etc., when use din the claims, are not intended to be limiting as to the size, but rather, are intended to serve as generic terms for blocks of data.

Moreover, various modifications based on trade-offs between hardware and software logic will be apparent to those skilled in the art.

Appendix A and B describe the signals used. The invention encompasses any modifications or alternative embodiments that fall within the scope of the claims.

TABLE 3-1

Appendix A
M1 = CPU
Cyrix ® Signal Description Table
3.1 Signal Description Table
The Signal Summary Table (Table 3-1) describes the signals in their active state unless otherwise mentioned. Signals containing slashes (/) have logic levels defined as "1/0." For example the signal W/R#, is defined as write when W/R# = 1, and as read when W/R# = 0. Signals ending with a "#" character are active low.
M1 Signals Sorted by Signal Name

| Signal Name | Description | I/O | Reference |
|---|---|---|---|
| A20M# | A20 Mask causes the CPU to mask (force to 0) the A20 address bit when driving the external address bus or performing an internal cache access. A20M# is provided to emulate the 1 MByte address wrap-around that occurs on the 8086. Snoop addressing is not effected. | Input | Page 3–9 |
| A31-A3 | The Address Bus, in conjunction with the Byte Enable signals (BE7#-BE0#), provides addresses for physical memory and external I/O devices. During cache inquiry cycles, A31-A5 are used as inputs to perform cache line invalidations. | 3-state I/O | Page 3–9 |
| ADS# | Address Strobe begins a memory/I/O cycle and indicates the address bus (A31-A3, BE7#-BE0#) and bus cycle definition signals (CACHE#, D/C#, LOCK#, M/IO#, PCD, PWT, SCYC, W/R#) are valid. | Output | Page 3–13 |
| ADSC# | Cache Address Strobe performs the same function as ADS#. | Output | Page 3–13 |
| AHOLD | Address Hold allows another bus master access to the M1<xxxx> address bus for a cache inquiry cycle. In response to the assertion of AHOLD, the CPU floats AP and A31-A3 in the following clock cycle. | Input | Page 3–18 |
| AP | Address Parity is the even parity output signal for address lines A31-A5 (A4 and A3 are excluded). During cache inquiry cycles, AP is the even-parity input to the CPU, and is sampled with EADS# to produce correct parity check status on the APCHK# output. | 3-state I/O | Page 3–10 |

TABLE 3-1-continued

Appendix A
M1 = CPU
Cyrix ® Signal Description Table
3.1 Signal Description Table
The Signal Summary Table (Table 3-1) describes the signals in their active state unless otherwise mentioned. Signals containing slashes (/) have logic levels defined as "1/0." For example the signal W/R#, is defined as write when W/R# = 1, and as read when W/R# = 0. Signals ending with a "#" character are active low.
M1 Signals Sorted by Signal Name

| Signal Name | Description | I/O | Reference |
|---|---|---|---|
| APCHK# | Address Parity Check Status is asserted during a cache inquiry cycle if an address bus parity error has been detected. APCHK# is valid two clocks after EADS# is sampled active. APCHK# will remain asserted for one clock cycle if a parity error is detected. | Output | Page 3–10 |
| BE7#-BE0# | The Byte Enables, in conjunction with the address lines, determine the active data bytes transferred during a memory or I/O bus cycle. | 3-state I/O | Page 3–9 |
| BHOLD | Byte Enable Hold forces the byte enables (BE7#-BE0#) to float during the next clock cycle. The M1<xxxx> continues to generate additional bus cycles while BHOLD is asserted. While BHOLD is asserted, the byte enables are driven by an external source and select which data bytes are accessed through the scatter/gather buffer. BHOLD is ignored if the scatter/gather interface is disabled. | Input | Page 3–20 |
| BOFF# | Back-Off forces the M1<xxxx> to abort the current bus cycle and relinquish control of the CPU local bus during the next clock cycle. The M1<xxxx> enters the bus hold state and remains in this state until BOFF# is negated. | Input | Page 3–16 |
| BRDY# | Burst Ready indicates that the current transfer within a burst cycle, or the current single transfer cycle, can be terminated. The M1<xxxx> samples BRDY# in the second and subsequent clocks of a bus cycle. BRDY# is active during address hold states. | Input | Page 3–13 |
| BRDYC# | Cache Burst Ready performs the same function as BRDY# and is logically ORed with BRDY# within the M1<xxxx>. | Input | Page 3–13 |
| BREQ | Bus Request is asserted by the M1<xxxx> when an internal bus cycle is pending. The M1<xxxx> always asserts BREQ, along with ADS#, during the first clock of a bus cycle. If a bus cycle is pending, BREQ is asserted during the bus hold and address hold states. If no additional bus cycles are pending, BREQ is negated prior to termination of the current cycle. | Output | Page 3–16 |
| CACHE# | Cacheability Status indicates that a read bus cycle is a potentially cacheable cycle; or that a write bus cycle is a cache line write-back or line replacement burst cycle. If CACHE# is asserted for a read cycle and KEN# is asserted by the system, the read cycle becomes a cache line fill burst cycle. | Output | Page 3–11 |
| CLK | Clock provides the fundamental timing for the M1<xxxx>. The frequency of the M1<xxxx> input clock determines the operating frequency of the CPU's bus. External timing is defined referenced to the rising edge of CLK. | Input | Page 3–7 |
| CLKMUL | The Clock Multiplier input is sampled during RESET to determine the M1<xxxx> core operating frequency. If CLKMUL = 0 or is left unconnected, the core frequency is 2x the frequency of the CLK input. If CLKMUL = 1, the core frequency is 3x the frequency of CLK. | Input | Page 3–7 |
| D63-D0 | Data Bus signals are three-state, bi-directional signals which provide the data path between the M1<xxxx> and external memory and I/O devices. The data bus is only driven while a write cycle is active (state = T2). The data bus is floated when DHOLD is asserted. | 3-state I/O | Page 3–10 |
| D/C# | Data/Control Status. If high, indicates that the current bus cycle is an I/O or memory data access cycle. If low, indicates a code fetch or special bus cycle such as a halt, prefetch, or interrupt acknowledge bus cycle. D/C# is driven valid in the same clock as ADS# is asserted. | Output | Page 3–11 |
| DHOLD | Data Bus Hold forces the M1<xxxx> to float the data bus (D63-D0) and the data parity lines (DP7-DP0) in the next clock. While DHOLD is asserted, only the data and data parity buses are disabled. The current bus cycle remains active and is completed in the normal fashion in response to BRDY#. The M1<xxxx> generates additional bus cycles while DHOLD is asserted. DHOLD is ignored if the scatter/gather interface is disabled. | Input | Page 3–21 |
| DP7-DP0 | Data Parity signals provide parity for the data bus, one data parity bit per data byte. Even parity is driven on DP7-DP0 for all data write cycles. DP7-DP0 are read by the M1<xxxx> during read cycles to check for even parity. The data parity bus is only driven while a write cycle is active (state = T2). | 3-state I/O | Page 3–10 |
| EADS# | External Address Strobe indicates that a valid cache inquiry address is being driven on the M1<xxxx> address bus (A31-A5) and AP. The state of INV at the time EADS# is sampled active determines the final state of the cache line. A cache inquiry cycle using EADS# may be run while the M1<xxxx> is in the address hold or bus hold state. | Input | Page 3–18 |
| EWBE# | External Write Buffer Empty indicates that there are no pending write cycles in the external system. EWBE# is sampled only during I/O and memory write cycles. If EWBE# is negated, the M1<xxxx> delays all subsequent writes to on-chip cache lines in the "exclusive" or "modified" state | Input | Page 3–14 |

TABLE 3-1-continued

Appendix A
M1 = CPU
Cyrix ® Signal Description Table
3.1 Signal Description Table
The Signal Summary Table (Table 3-1) describes the signals in their active state unless otherwise mentioned. Signals containing slashes (/) have logic levels defined as "1/0." For example the signal W/R#, is defined as write when W/R# = 1, and as read when W/R# = 0. Signals ending with a "#" character are active low.
M1 Signals Sorted by Signal Name

| Signal Name | Description | I/O | Reference |
|---|---|---|---|
| | until EWBE# is asserted. | | |
| FERR# | FPU Error Status indicates an unmasked floating point error has occurred. FERR# is asserted during execution of the FPU instruction that caused the error. FERR# does not float during bus hold states. | Output | Page 3–19 |
| FLUSH# | Cache Flush forces the M1<xxxx> to flush the cache. External interrupts and additional FLUSH# assertions are ignored during the flush. Cache inquiry cycles are permitted during the flush. | Input | Page 3–15 |
| HIT# | Cache Hit indicates that the current cache inquiry address has been found in the cache (modified, exclusive or shared states). HIT# is valid two clocks after EADS# is sampled active, and remains valid until the next cache inquiry cycle. | Output | Page 3–18 |
| HITM# | Cache Hit Modified Data indicates that the current cache inquiry address has been found in the cache and dirty data exists in the cache line (modified state). The M1<xxxx> does not accept additional cache inquiry cycles while HITM# is asserted. HITM# is valid two clocks after EADS#. | Output | Page 3–18 |
| HLDA | Hold Acknowledge indicates that the M1<xxxx> has responded to the HOLD input and relinquished control of the local bus. The M1<xxxx> continues to operate during bus hold as long as the on-chip cache can satisfy bus requests. | Output | Page 3–16 |
| HOLD | Hold Request indicates that another bus master has requested control of the CPU's local bus. | Input | Page 3–16 |
| IGNNE# | Ignore Numeric Error forces the M1<xxxx> to ignore any pending unmasked FPU errors and allows continued execution of floating point instructions. | Input | Page 3–19 |
| INTR | Maskable Interrupt forces the processor to suspend execution of the current instruction stream and begin execution of an interrupt service routine; The INTR input can be masked (ignored) through the IF bit in the Flags Register. | Input | Page 3–14 |
| INV | Invalidate Request is sampled with EADS# to determine the final state of the cache line in the case of a cache inquiry hit. An asserted INV directs the processor to change the state of the cache line to "invalid". A negated INV directs the processor to change the state of the cache line to "shared." | Input | Page 3–18 |
| KEN# | Cache Enable allows the data being returned during the current cycle to be placed in the CPU's cache. When the M1<xxxx> is performing a cacheable code fetch or memory data read cycle (CACHE# asserted), and KEN# is sampled asserted, the cycle is transformed into a 32-byte cache line fill. KEN# is sampled with the first asserted BRDY# or NA# for the cycle. | Input | Page 3–15 |
| LBA# | Local Bus Access indicates that the current bus cycle is for an address within the local bus address region. If LBA# is asserted during a CPU write cycle with BE3#-BE0# negated, the M1<xxxx> automatically maps the upper DWORD of data to the lower DWORD of the data bus. LBA# floats if scatter/gather pins are disabled. | Output | Page 3-21 |
| LOCK# | Lock Status indicates that other system bus masters are denied access to the local bus. The M1<xxxx> does not enter the bus hold state in response to HOLD while LOCK# is asserted. | Output | Page 3–11 |
| M/IO# | Memory/IO Status. If high, indicates that the current bus cycle is a memory cycle (read or write). If low, indicates that the current bus cycle is an I/O cycle (read or write, interrupt acknowledge, or special cycle). | Output | Page 3–11 |
| NA# | Next Address requests the next pending bus cycle address and cycle definition information. If either the current or next bus cycle is a locked cycle, a line replacement, a write-back cycle, or if there is no pending bus cycle, the M1<xxxx> does not start a pipelined bus cycle regardless of the state of NA#. | Input | Page 3–13 |
| NMI | Non-Maskable Interrupt Request forces the processor to suspend execution of the current instruction stream and begin execution of an NMI interrupt service routine. | Input | Page 3–14 |
| PCD | Page Cache Disable reflects the state of the PCD page attribute bit in the page table entry or the directory table entry. If paging is disabled, or for cycles that are not paged, the PCD pin is driven low. PCD is masked by the cache disable (CD) bit in CR0, and floats during bus hold states. | Output | Page 3–15 |
| PCHK# | Data Parity Check indicates that a data bus parity error has occurred during a read operation. PCHK# is only valid during the second clock immediately after read data is returned to the M1<xxxx> (BRDY# asserted) and is inactive otherwise. Parity errors signaled by a logic low on PCHK# have no effect on processor execution. | Output | Page 3–10 |
| PWT | Page Write Through reflects the state of the PWT page attribute bit in the page table entry or the directory table entry PWT pin is negated during cycles | Output | Page 3–15 |

TABLE 3-1-continued

Appendix A
M1 = CPU
Cyrix ® Signal Description Table
3.1 Signal Description Table The Signal Summary Table (Table 3-1) describes the signals in their active state unless otherwise mentioned. Signals containing slashes (/) have logic levels defined as "1/0." For example the signal W/R#, is defined as write when W/R# = 1, and as read when W/R# = 0. Signals ending with a "#" character are active low.

M1 Signals Sorted by Signal Name

| Signal Name | Description | I/O | Reference |
|---|---|---|---|
| | that are not paged, or if paging is disabled. PWT takes priority over WB/WT#. | | |
| QDUMP# | Q Buffer Dump is used to dump the contents of the scatter/gather buffer onto the data bus. The data bytes specified by the byte enables (BE7#-BE0#) are driven onto the data bus during the clock after QDUMP# is sampled asserted. QDUMP# is ignored if the scatter/gather pins are disabled. | Input | Page 3–22 |
| RESET | Reset suspends all operations in progress and places the M1<xxxx> into a reset state. Reset forces the CPU to begin executing in a known state. All data in the on-chip caches is invalidated. | Input | Page 3–7 |
| SCYC | Split Locked Cycle indicates that the current bus cycle is part of a misaligned locked transfer. SCYC is defined for locked cycles only. A misaligned transfer is defined as any transfer that crosses an 8-byte boundary. | Output | Page 3-11 |
| SMI# | SMM Interrupt forces the processor to save the CPU state to the top of SMM memory and to begin execution of the SMI service routine at the beginning of the defined SMM memory space. An SMI is a higher-priority interrupt than an NMI. | Input | Page 3-14 |
| SMIACT# | SMM Interrupt Active indicates that the processor is operating in System Management Mode. SMIACT# does not float during bus hold states. | Output | Page 3–13 |
| SUSP# | Suspend Request requests that the CPU enter suspend mode. SUSP# is ignored following RESET and is enabled by setting the SUSP bit in CCR2. | Input | Page 3–22 |
| SUSPA# | Suspend Acknowledge indicates that the M1<xxxx> has entered low-power suspend mode. SUSPA# floats following RESET and is enabled by setting the SUSP bit in CCR2. | Output | Page 3–22 |
| TCK | Test Clock (JTAG) is the clock input used by the M1<xxxx>'s boundary scan (JTAG) test logic. | Input | Page 3–24 |
| TDI | Test Data In (JTAG) is the serial data input used by the M1<xxxx>'s boundary scan (JTAG) test logic. | Input | Page 3–24 |
| TDO | Test Data Out (JTAG) is the serial data output used by the M1<xxxx>'s boundary scan (JTAG) test logic. | Output | Page 3–24 |
| TMS | Test Mode Select (JTAG) is the control input used by the M1<xxxx>'s boundary scan (JTAG) test logic. | Input | Page 3–24 |
| TRST# | Test Mode Reset (JTAG) initializes the M1<xxxx>'s boundary scan (JTAG) test logic. | Input | Page 3–24 |
| WB/WT# | Write-Back/Write-Through is sampled during cache line fills to define the cache line write policy. If high, the cache line write policy is write-back. If low, the cache line write policy is write-through. (PWT forces write-through policy when PWT = 1.) | Input | Page 3–15 |
| WM_RST | Warm Reset forces the M1<xxxx> to complete the current instruction and then places the M1<xxxx> in a known state. Once WM_RST is sampled active by the CPU, the reset sequence begins on the next instruction boundary. WM_RST does not change the state of the configuration registers, the on-chip cache, the write buffers and the FPU registers. WM_RST is sampled during reset. | Input | Page 3–9 |
| W/R# | Write/Read Status. If high, indicates that the current memory, or I/O bus cycle is a write cycle. If low, indicates that the current bus cycle is a read cycle. | Output | Page 3–11 |

CHAPTER 3
Pin Description
Appendix B
PAM = M/B controller 3.1 Overview
PAM is packaged into a 208 PQFP. This package allows the VL-Bus controls to be buffered internally through PAM.
3.2 Signal Description
3.2.1 VL-PAM Interface (26 pins)
The VESA VL-Bus interface is compliant with the VESA VL-Bus Local Bus Standard, Revision 2.0. Memory devices living on the VL-Bus will not be cached. Since the CPU processor bus could be running at twice the frequency of the VL-Bus, VL-Bus devices will not be allowed to cache any CPU cycles. The KEN# signal should be tied high (Note that KEN# is being removed in Revision 1.1). PAM assumes a 32-bit VL-Bus. To transfer data between the VL-Bus and a 64 bit CPU, a proprietary algorithm has been developed (See the -continued CHAPTER 3
Pin Description
Appendix B
PAM = M/B controller section: QGather Timing on page 2). For a more thorough descriptions of specific VL-Bus timing, see the VESA VL-Bus spec. External support can be added to include the 64-bit extension to the VL-BUS.

3.2.1.1 LCLK
Output. This clock is synchronous with PCLK (3.2.8.1). The configuration registers allow this clock to be 1X, 1/2X or 2/3X PCLK.

3.2.1.2 ADR2
Output. ADR2 is generated by asynchronously decoding the byte enables from the CPU.

3.2.1.3 RDYRTN#
Output. Like the 486 RDY# signal. An unsynced version of this signal is sent directly from the VL-Bus to the CPU Bus. For CPU-VL reads, RDYRTN# is delayed by one VLCLK from LRDY# allowing the CPU to resync. For CPU-VL writes RDYRTN# is echoed back asynchronously in the same state as LRDY#.

3.2.1.4 LADS#
Input/Output. This signal is transferred asynchronously from ADS# (3.2.5.2) to the VL-Bus when the VLCLK is high. When the VLCLK is low, LADS# is held until the next VLCLK high period. For VL-Bus master cycles, the QGather protocol is used. Since LCLK can operate at 1X, 2/3X or 1/2X the main processor clock, a different synchronization method is used for each speed.

PAM Specification: Pin Description

FIG. 3 1X LADS# - ADS# timing.)

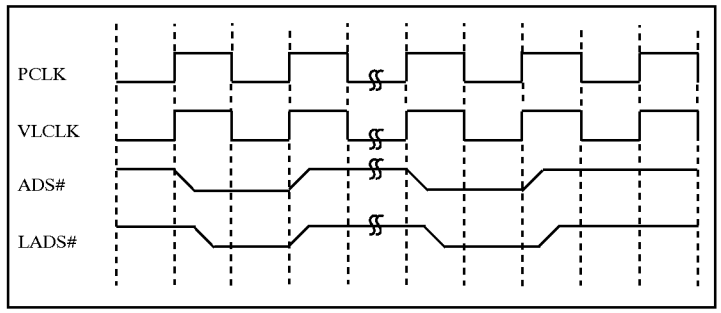

ADS# Occurs Synchronously with LADS#
FIG. 4 2/3X LADS# - ADS# timing.)

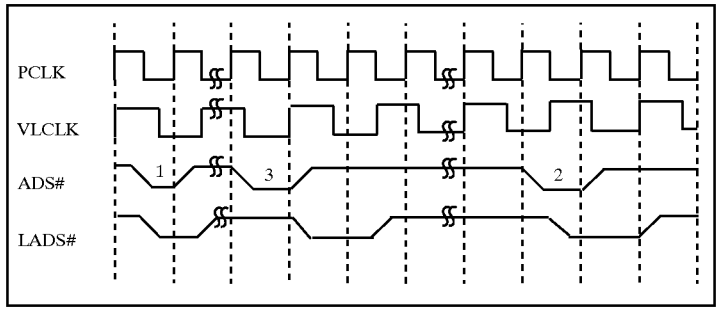

ADS# can occur in three different places with respect to VLCLK.
FIG. 5 1/2X LADS# - ADS# timing.)

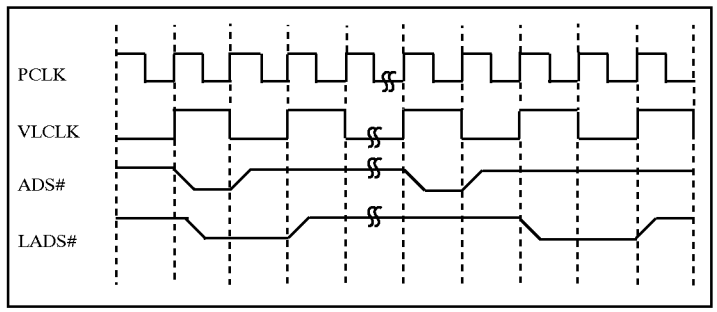

-continued

CHAPTER 3
Pin Description
Appendix B
PAM = M/B controller

ADS# can occur in two different places with respect to VLCLK.
3.2.1.5 LGNT2#-LGNT0#
Output. Used in conjunction with LREQ3#-LREQ0# for arbitration.
3.2.1.6 LREQ2#-LREQ0#
Input. Used to request a master mode cycle.
3.2.1.7 LDEV2#-LDEV0#
Input: Returned from a VL-Bus device whenever is detects a valid address. The ISA bus controller doesn't have a LDEV# and automatically goes active if LDEV2#-LDEV0# remain inactive. See HLOCAL# on page 4
3.2.1.8 LRDY#
Input: Shared ready signals that specifies the end of a local bus cycle. PAM asynchronously generates RDYRTN# and synchronously generates RDY# from this signal.
3.2.1.9 LBS16#:
Input/Output. Active one cycle before LRDY#. Since the CPU doesn't have a BS16# input, PAM must generate two bus cycles for every 32 bit access. For VL-Bus to system memory cycles, this signal is always false.
3.2.1.10 LBRDY#:
Input/Output. This has to be synced to the CPU CLK so it must be buffered through PAM. During Master Mode cycles, this signal is driven by PAM to signal the termination of a burst cycle.
3.2.1.11 LBE3#-LBE0#:
Input/Output. These are generated from BE7#-BE0# for four byte aligned transfers. Or for the second LADS# of a transfer that spans a four byte boundary PAM generates them internally.
3.2.1.12 LM/IO#
Input/Output#. Buffered version of CPU M/IO#.
3.2.1.13 LW/R#
Write/Read#. Buffered version of CPU W/R#.
3.2.1.14 LD/C#
Data/Control#. Buffered version of CPU D/C#.
3.2.1.15 LDATA 0
Least significant bit of the local data bus. Used to configure PAM's internal registers.
 3.2.2 VL-CPU Buffer Control Signals
3.2.2.1 VLBUFEN#
Output. Turns on VL-CPU Buffer output drivers.
3.2.2.2 VLDDIR
Output. Controls the VL Buffers data direction. Active indicates a write from the PBUS to the VL-BUS.
3.2.2.3 VLADIR
Output. Controls the VL Buffers address direction. Active indicates a CPU initiated access, Inactive indicates a VL Master mode cycle is in progress. The enable for the VL address buffers should be tied to the inversion of HITM# (since Pam doesn't support the WBACK# pin, a mechanism must occur to disable the VL address during write-back cycles).
 3.2.3 ISA Controller Interface
3.2.3.1 HBS16#
Input. Buffered BS16 for the ISA controller.
3.2.3.2 HHOLD
Input. Bus request signal for the ISA controller. Used internally like LREQ.
3.2.3.3 HHOLDA
Output. Bus grant signal for the ISA controller. Used internally like LGNT.
3.2.3.4 HDIR
Output. Direction of ISA Buffers. Active indicates a write to the ISA bus.

We claim:

1. In a computer system with a processor (CPU) coupled to system memory over a local bus at least 2N bytes wide, and to peripheral devices over a peripheral bus N bytes wide, the local bus having at least first and second bus lanes each N bytes wide respectively for transferring first and second data blocks of N-bytes each, where the computer system includes byte enable control lines used by the CPU to signal, for each data transfer, a byte enable code uniquely identifying each byte of the first and second data blocks that is involved in the data transfer, a CPU-Peripheral bus interface for transferring data between the CPU and a peripheral device, comprising (a) bus interconnect logic external to the CPU that interconnects the N bit peripheral bus to the first bus lane of the local bus;
(b) interface buffer logic coupled to the CPU and to the local bus, including an interface buffer for storing at least a 2N-byte data block in first and second buffer blocks corresponding to the first and second data blocks; and
(c) interface control logic external to the CPU, coupled to the byte enable control lines, and coupled to exchange interface protocol signals with the interface buffer logic and the CPU to control the loading and unloading of the interface buffer;
(d) the interface protocol signals include byte enable codes and a BE control signal asserted by the interface control logic to cause the CPU to relinquish control of the byte enable control lines, such that the interface control logic is able to drive the BE control lines with byte enable codes;
(e) the interface control logic using the interface protocol signals, including the BE control signal and byte enable codes to effect the transfer of data between the CPU and a peripheral device through the bus interface logic;
(f) such that transfers of first and second data blocks between the CPU and the peripheral device occur serially over the N-bit first bus lane of the local bus and the N-bit peripheral bus through the bus interface logic circuit.

2. The CPU-Peripheral bus interface of claim 1, wherein the interface control logic effects the transfer of data between the CPU and a peripheral device by (i) for transfer from the peripheral device to the CPU, loading the interface buffer by using byte enable codes to steer selected bytes of the first and second data blocks received from the peripheral device respectively to the first and second buffer blocks of the interface buffer, and (ii) for transfers from the CPU to the peripheral device, unloading the interface buffer by using byte enable codes to steer selected bytes of the first and second data blocks respectively from the first and second buffer blocks of the interface buffer to the first bus lane of the local bus.

3. A method of transferring data between a processor (CPU) and a peripheral device, used in a computer system in which the CPU is coupled to a system memory over a local bus at least 2N bytes wide, and to peripheral devices over a peripheral bus N bytes wide, the local bus having at least first and second bus lanes each N bytes wide respectively for transferring first and second data blocks of N-bytes each, where the computer system includes byte enable control lines used by the CPU to signal, for each data transfer, a byte enable code uniquely identifying each byte of the first and second data blocks that is involved in the data transfer, comprising the steps:

(a) providing an interface buffer for storing at least a 2N-byte data block in first and second buffer blocks corresponding to the first and second data blocks;

(b) generating, in interface control logic external to the CPU, interface protocol signals to control the loading and unloading of the interface buffer;

(c) the interface protocol signals including byte enable codes and a BE control signal to cause the CPU to relinquish control of the byte enable control lines, such that the interface control logic is able to drive the BE control lines with byte enable codes;

(d) effecting the transfer of data between the CPU and a peripheral device using the interface protocol signals, such that transfers of first and second data blocks between the CPU and the peripheral device occur serially over the N-bit first bus lane of the local bus and the N-bit peripheral bus through the interface buffer.

4. The method of transferring data between a processor (CPU) and a peripheral device of claim 3 wherein the step of affecting the transfer of data between the CPU and a peripheral device includes the sub steps of (i) for transfers from the peripheral device to the CPU, loading the interface buffer by using byte enable codes to steer selected bytes of the first and second data blocks received from the peripheral device respectively to the first and second buffers blocks of the interface buffer, and (ii) for transfers from the CPU to the peripheral device, unloading the interface buffer by using byte enable codes to steer selected bytes of the first and second data blocks respectively from the first and second buffer blocks of the interface buffer to the first bus lane of the local bus.

* * * * *